United States Patent
Hampel

(10) Patent No.: US 10,075,888 B2
(45) Date of Patent: Sep. 11, 2018

(54) SERVICE-SPECIFIC AIR-INTERFACE SELECTION

(71) Applicant: QUALCOMM Incorporated, San Diego, CA (US)

(72) Inventor: Karl Georg Hampel, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 14/863,747

(22) Filed: Sep. 24, 2015

(65) Prior Publication Data

US 2016/0095034 A1    Mar. 31, 2016

Related U.S. Application Data

(60) Provisional application No. 62/055,452, filed on Sep. 25, 2014.

(51) Int. Cl.
| | | |
|---|---|---|
| *H04W 36/14* | (2009.01) | |
| *H04W 36/00* | (2009.01) | |
| *H04W 36/30* | (2009.01) | |
| *H04W 76/16* | (2018.01) | |
| *H04W 88/06* | (2009.01) | |
| *H04W 76/02* | (2009.01) | |

(52) U.S. Cl.
CPC ....... *H04W 36/14* (2013.01); *H04W 36/0055* (2013.01); *H04W 36/30* (2013.01); *H04W 36/0027* (2013.01); *H04W 76/026* (2013.01); *H04W 76/16* (2018.02); *H04W 88/06* (2013.01)

(58) Field of Classification Search
None
See application file for complete search history.

(56) References Cited

U.S. PATENT DOCUMENTS

| | | |
|---|---|---|
| 6,965,585 B2 | 11/2005 | Grilli et al. |
| 8,639,239 B2 | 1/2014 | Uemura et al. |
| 8,818,371 B2 | 8/2014 | Watanabe |
| 2010/0208698 A1* | 8/2010 | Lu ............... H04W 36/0027 370/331 |

(Continued)

FOREIGN PATENT DOCUMENTS

WO    WO 2014056380 A1    4/2014

OTHER PUBLICATIONS

IPEA/EP, Second Written Opinion of the International Preliminary Examining Authority, Int'l Application No. PCT/US2015/052181, dated Sep. 28, 2016, European Patent Office, Munich, DE, 6 pgs.

(Continued)

*Primary Examiner* — Charles C Jiang
*Assistant Examiner* — Saad Khawar
(74) *Attorney, Agent, or Firm* — Holland & Hart LLP

(57) ABSTRACT

Methods, systems, and devices are described for wireless communication at a UE. A first radio configuration is received. The first radio configuration for a first service on a first air interface to a first base station. A second radio interface is received. The second radio configuration for a second service on a second air interface to a second base station. A first measurement report is transmitted to the first base station over the first air interface. The first measurement report includes information related to at least one of the first air interface and the second air interface.

29 Claims, 23 Drawing Sheets

(56) References Cited

U.S. PATENT DOCUMENTS

| | | | |
|---|---|---|---|
| 2011/0028181 A1 | 2/2011 | Byun et al. | |
| 2011/0300872 A1* | 12/2011 | Lim | H04W 36/18 |
| | | | 455/450 |
| 2013/0044709 A1* | 2/2013 | Adjakple | H04W 76/025 |
| | | | 370/329 |
| 2013/0088983 A1 | 4/2013 | Pragada et al. | |
| 2013/0107863 A1* | 5/2013 | Faccin | H04W 36/0022 |
| | | | 370/331 |
| 2013/0324107 A1 | 12/2013 | Lindoff et al. | |
| 2014/0200016 A1 | 7/2014 | Siomina et al. | |
| 2014/0362775 A1* | 12/2014 | Steiner | H04W 76/045 |
| | | | 370/329 |
| 2015/0351135 A1* | 12/2015 | Schmidt | H04W 76/02 |
| | | | 455/450 |
| 2015/0358866 A1* | 12/2015 | Xu | H04W 36/00 |
| | | | 370/331 |
| 2016/0198383 A1* | 7/2016 | Worrall | H04W 36/0088 |
| | | | 370/332 |
| 2016/0219475 A1* | 7/2016 | Kim | H04W 76/025 |
| 2016/0338039 A1* | 11/2016 | Van Der Velde | H04W 24/02 |
| 2017/0034709 A1* | 2/2017 | Hapsari | H04W 16/14 |

OTHER PUBLICATIONS

ISA/EPO, International Search Report and Written Opinion of the International Searching Authority, Int'l App. No. PCT/US2015/052181, dated Dec. 21, 2015, European Patent Office, Rijswijk, NL, 13 pgs.

* cited by examiner

SERVICE-SPECIFIC AIR-INTERFACE SELECTION

CROSS REFERENCES

The present application for patent claims priority to U.S. Provisional Patent Application No. 62/055,452 by Hampel et al., entitled "Service-Specific Air-Interface Selection," filed Sep. 25, 2014, assigned to the assignee hereof, and expressly incorporated by reference herein.

BACKGROUND

Field of Disclosure

The following relates generally to wireless communication, and more specifically to the coordination of radio configuration, measurement configurations, and measurement reports during simultaneous multi-air-interface operation.

Description of Related Art

The following relates generally to wireless communication, and more specifically to an aggregation or coupling of disparate radio access technologies (RATs) to communicate data between a user equipment (UE) and network equipment. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with UEs on downstream and upstream links. A wireless multi-access communication system may use any number of different frequency bands or wireless communication technologies depending on the particular needs of the system. For example, a UE may have several different types of services with varying characteristics to communicate to the network. However, introducing new air-interface technologies to support the different types of services may require development of a new core network.

SUMMARY

The described features generally relate to one or more improved systems, methods, and/or apparatuses for allowing a UE to simultaneously establish a data session on multiple air-interface technologies using the same Mobility Management Entities (MME) and Serving gateway (S-GW) of an existing core network. In some examples, a UE may have capabilities to independently support signaling radio bearers and data radio bearers for multiple air interfaces. As a result, a UE may dynamically select one or more air-interface technologies for different types of services based on varying characteristics of the service. In one example, a first service (e.g., voice over internet protocol) may be best suited for transmission over a first air interface (e.g., LTE). In other examples, a second service (e.g., web browsing) may be suited for a second air interface (e.g., millimeter wave) based on the properties of the service. Thus, in accordance with the present disclosure, a UE may perform the first service over the LTE air-interface, while simultaneously performing the second service over the millimeter wave (mmW) air-interface.

In other examples, a UE may be adapted to conduct an inter-air interface handover based on detection of a handover event. The handover event may be based on a measurement report transmitted from the UE and/or a reestablishment procedure due to a radio-link failure (RLF). In some examples, when the UE encounters an RLF on a first base station supporting one air-interface technology (e.g., LTE), the UE may conduct forward handover to a second base station supporting a different air-interface technology (e.g., millimeter wave (mmW) air-interface technology) based on bearer-specific policy information. In other examples, a first base station supporting a first air interface technology may configure the UE to take signal quality measurements of a second a base station supporting a second air interface technology.

In a first illustrative set of examples, a method of wireless communication at a user equipment (UE) is provided. The method may include: receiving a first radio configuration for a first service on a first air interface to a first base station; receiving a second radio configuration for a second service on a second air interface to a second base station; and transmitting, based on the first radio configuration, a first measurement report to the first base station over the first air interface, the first measurement report comprising information related to at least one of the first air interface and the second air interface.

In some aspects, the first radio configuration is associated with a first connection to a core network, and wherein the second radio configuration is associated with a second connection to the core network. The method may include performing a handover of the first connection to the second base station concurrently with performing communications via the second base station and the core network. The method may include: initiating establishment of the first radio configuration via a first service request message to a core network; and initiating establishment of the second radio configuration via a second service request message to the core network while exchanging data with the core network via the first radio configuration. The first service request message may include a first service type identifier and the second service request message may include a second service type identifier.

In some aspects, the method may include transmitting, based on the second radio configuration, a second measurement report to the second base station over the second air interface, the second measurement report including information related to the first air interface. The second radio configuration message may include information on a measurement algorithm and a trigger condition for the second air interface. The first radio configuration may include information associated with a first measurement algorithm and a first trigger condition for the first air interface and the second radio configuration may include information associated with a second measurement algorithm and a second trigger condition for the second air interface. The method may include complying with both the first measurement algorithm and the first trigger condition set forth in the first radio configuration and the second measurement algorithm and the second trigger condition set forth in the second radio configuration.

In some aspects, the first radio configuration may include information associated with a measurement algorithm and a trigger condition for both the first air interface and the second air interface. The method may include: receiving a reconfiguration message over the first air interface or the second air interface; and conducting an inter-air interface handover based at least in part on the reconfiguration message. The inter-air interface handover may include an inter-air interface handover of a subset of bearers from the first air interface to the second air interface. The method may include establishing a radio bearer with at least one of the first or the second base station. The method may include establishing the radio bearer with the first base station over the first air interface while simultaneously exchanging data with the second base station over the second air interface.

In some aspects, the method may include transmitting a first request to a mobility management entity (MME), the first request indicating a type of the first air interface and transmitting a second request to the MME, the second request indicating a type of the second air interface. The first request and the second request may be non-access stratum (NAS) service requests. The first request and the second request may each include a Globally Unique Mobility Management Entity Identifier (GUMMEI) that identifies the MME.

In some aspects, the method may include: securing a first session over the first air interface using a first security key, the first security key derived based on a session key (Kasme); and securing a second session over the second air interface using a second security key, the second security key derived based on the Kasme, wherein the first and the second security key are different. The method may include: detecting a radio link failure (RLF) on at least one of the first air interface or the second air interface; and conducting an inter-air interface handover based at last in part on the detected RLF, wherein conducting the inter-air interface handover may include providing a target base station information associated with at least one of the first or second base stations.

In some aspects, a first session over the first air interface and a second session over the second air interface may be established using a single a mobility management entity (MME). A first session over the first air interface and a second session over the second air interface may be established using a single serving gateway (S-GW). The first air interface may be a Long Term Evolution (LTE) air interface and the second air interface may be a millimeter-wave air interface. A first type of service may be performed over the first air interface and a second type of service may be performed simultaneously over the second air interface.

In a second illustrative set of examples, an apparatus for wireless communication at a user equipment (UE) is provided. The apparatus may include: means for receiving a first radio configuration for a first service on a first air interface to a first base station; means for receiving a second radio configuration for a second service on a second air interface to a second base station; and means for transmitting, based on the first radio configuration, a first measurement report to the first base station over the first air interface, the first measurement report comprising information related to at least one of the first air interface and the second air interface.

In some aspects, the first radio configuration may be associated with a first connection to a core network, and wherein the second radio configuration may be associated with a second connection to the core network. The apparatus may include means for performing a handover of the first connection to the second base station concurrently with performing communications via the second base station and the core network. The apparatus may include: means for initiating establishment of the first radio configuration via a first service request message to a core network; and means for initiating establishment of the second radio configuration via a second service request message to the core network while exchanging data with the core network via the first radio configuration. The first service request message may include a first service type identifier and the second service request message may include a second service type identifier.

In a third illustrative set of examples, an apparatus for wireless communication at a user equipment (UE) is provided. The apparatus may include: a processor; memory in electronic communication with the processor; and instructions stored in the memory. The instructions are executable by the processor to: receive a first radio configuration for a first service on a first air interface to a first base station; receive a second radio configuration for a second service on a second air interface to a second base station; and transmit, based on the first radio configuration, a first measurement report to the first base station over the first air interface, the first measurement report comprising information related to at least one of the first air interface and the second air interface.

In a fourth illustrative set of examples, a non-transitory computer-readable medium storing code for wireless communication at a user equipment (UE) is provided. The code may include instructions executable to: receive a first radio configuration for a first service on a first air interface to a first base station; receive a second radio configuration for a second service on a second air interface to a second base station; and transmit, based on the first radio configuration, a first measurement report to the first base station over the first air interface, the first measurement report comprising information related to at least one of the first air interface and the second air interface.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
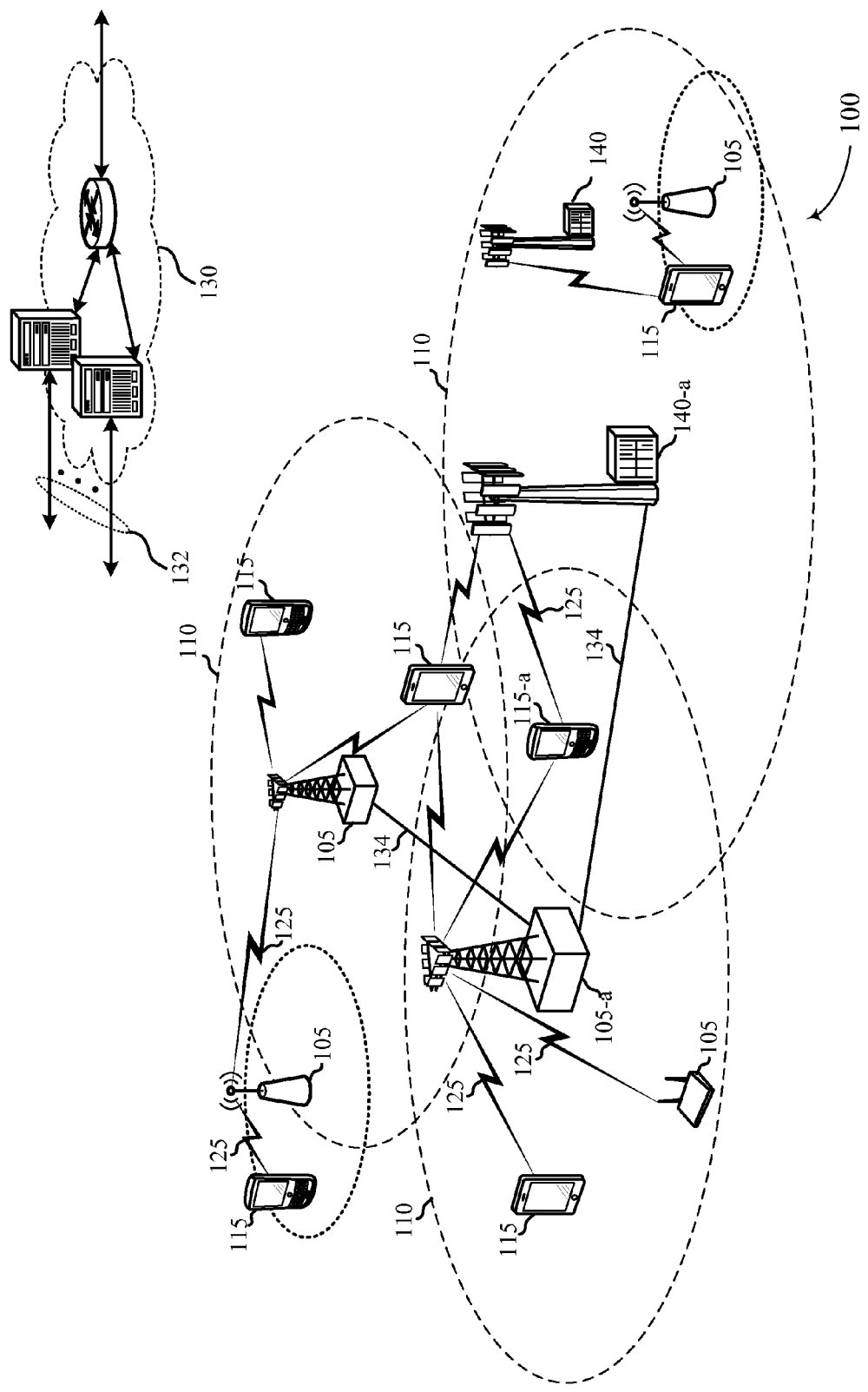
FIG. 1 illustrates an example of a wireless communications system for service specific air interface selection in accordance with various aspects of the present disclosure.

The described features generally relate to improved systems, methods, and/or apparatuses for service-specific air-interface selection. For example, the techniques described in the present disclosure may allow a UE to simultaneously establish multiple data connections supporting data sessions on multiple air-interface technologies using the same core network functions such as the Mobility Management Entities (MME) and Serving gateways (S-GW). In some examples, a UE may have capabilities to independently support radio configurations for multiple air interfaces, where each radio configuration may include one or more data radio bearers and may contain a measurement configuration. As a result, a UE may dynamically select among one or more air-interface technologies for different types of services based on varying characteristics of the service. In one example, a first service (e.g., voice over internet protocol, VOIP) may be best suited for transmission over a first air interface (e.g., LTE). In other examples, a second service (e.g., web browsing) may be suited for a second or third air interface (e.g., millimeter wave (mmW) or Wi-Fi) based on the properties of the service. Thus, in accordance with the present invention, a UE may perform the first service over the LTE air-interface, while simultaneously performing the second service over the millimeter wave (mmW) or the Wi-Fi air-interface.

Based on the measurement configuration for each radio configuration, the UE may conduct measurements, determine trigger events, and send measurement reports to the network for each radio configuration. In some examples, a first base station (BS) supporting a first air interface technology (e.g., LTE) may configure the UE to report BSs based on signal quality measurements on a second air interface technology (e.g., mmW).

In another example, the first BS supporting a first radio configuration with the UE may configure the UE to report BSs based on signal quality measurement on a first air interface technology and a second air interface technology while a second BS supporting a simultaneous second radio configuration with the UE may configure the UE to report BSs based on signal quality measurements on a third air interface. The third air interface technology may be identical to one of the first and the second air interface technologies.

In some examples, the UE may be adapted to conduct a service-specific handover based on the radio-configuration-specific measurement reports. The service-specific handover migrates a first radio configuration supporting a selected set of services from a first BS using a first air interface to a second BS using a first or a second air interface. The UE may continue running other services on a second radio configuration with a third BS using a third air interface. For example, a VoIP service on one radio configuration could remain running on an LTE macro cell while a best-effort file exchange service using another radio configuration is migrated between multiple mmW and Wi-Fi pico cells. When the boundary of the pico cell coverage area is reached, the best-effort file exchange service may also be migrated to LTE.

In an example where the radio link sustaining a first radio configuration encounters radio link failure (RLF) while other radio links are still active, the UE may conduct a connection reestablishment procedure for the lost radio configuration using target-BSs and air interfaces provided by the measurement configuration pertaining to the radio configuration of the lost link.

In some examples, the UE may support a first connection with the core network via a first radio configuration and simultaneously support a second connection with the core network via a second radio configuration. The first connection may be dedicated to support a first set of services while the second connection may be dedicated to support a second set of services. The UE may use a first service request to the core network to establish the first connection and the first radio configuration and a consecutive second service request to the core network to establish the second connection and the second radio configuration. The UE may select a first air interface for the first service request and a second air interface for the second service request. The UE may apply this selection based on a policy table, for example, that identifies the air-interface selection priority for various services. The UE may establish any of the connections proactively (e.g., independently) or based on a paging message received from the network. For example, the UE may receive the paging message for a second service on a signaling channel supporting a first service on a first connection.

Utilization of the described independent connections, radio- and measurement configurations for different services may provide for improved systems, methods, and/or apparatuses for service-specific air-interface selection. For example, the described techniques provide for the selection of air-interface and for the BS may be optimized to the characteristics of each service (e.g., such as service-specific latency, throughput, jitter, etc.). The described techniques provide for a service ramp up for a service that may occur quickly on the appropriate air interface.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a diagram illustrates an example of a wireless communications system 100. The wireless communications system 100 may include base station network equipment 105, communication User Equipment (UEs) 115, and a core network 130. The base station network equipment 105 may support a number of cells for communicating with the UEs 115 and may be coupled to a core network 130. Base station network equipment 105 may communicate control information and/or user data with the core network 130 through backhaul links 132. In embodiments, the base station network equipment 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base station network equipment 105 and/or base station network equipment 140 may wirelessly communicate with the UEs 115 via one or more base station antennas. Each of the base station network equipment 105 or 140 sites may provide communication coverage for a respective geographic coverage area 110. In some embodiments, base station network equipment 105 may be referred to as simply a base station, a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The geographic coverage area 110 for a base station network equipment may be divided into sectors making up only a portion of the coverage area (not shown). The wireless communications system 100 may include base station network equipment 105 of different types (e.g., macro, micro, and/or pico base stations). In some examples, the wireless communications system 100 may additionally include base station network equipment 140 supporting a different type of air-interface (e.g., mmW). There may be overlapping coverage areas for different technologies.

In embodiments, the wireless communications system 100 may be an LTE/LTE-A network. In LTE/LTE-A networks, the terms evolved Node B (eNB) and user equipment (UE) may be generally used to describe base station network equipment 105 and mobile devices, respectively. The wireless communications system 100 may be a Heterogeneous LTE/LTE-A network in which different types of eNBs provide coverage for various geographical regions. For example, each base station network equipment 105 may operate as a macro cell, a pico cell, a femto cell, and/or other types of cell or power classifications. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and may provide restricted access to UEs having an association with the femto cell (e.g., UEs in a closed subscriber group (CSG), UEs for users in the home, and the like), open access, or hybrid access. An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, wireless communication system 100 may operate in an ultra-high frequency (UHF) region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beam forming). However, EHF transmissions may be subject to even greater atmospheric attenuation and shorter range than UHF transmissions.

In certain examples, heterogeneous radio access technologies (RAT) may be available within the wireless communications system such that the UEs 115 may access the core network 130 over an aggregation of different air interfaces technologies (e.g., LTE and/or mmW). For example, a first base station network equipment 105-a of the wireless communications system 100 may include wideband communication such as LTE eNB elements. Additionally or alternatively, a second base station network equipment 140-a operating in the wireless communication system 100 may alternatively support a narrowband communication such as mmW access elements. It should be understood by those in the art that the disclosure of the present application is not limited to a specific subset of air interfaces (i.e., wideband or narrowband air interfaces). Instead, the present disclosure may be adopted for any number of air interface types available for establishing data communication. In additional or alternative example, an LTE eNBs element and mmW access point elements may be collocated at the first base station network equipment 105 and/or the second base station network equipment 140-a. Thus, in some examples, a UE 115-a may be configured to simultaneously run bearers on multiple air-interface technologies to connect to the core network 130, and may select an air-interface technology dependent on the characteristics of the particular service.

A base station 105 and/or 140 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the evolved packet core (EPC). All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP Multimedia Subsystem (IMS), and a Packet-Switched (PS) Streaming Service (PSS).

In some cases, a UE 115 may be transferred from a serving base station 105 (known as the source base station) to another base station 105 (known as the target base station). For example, the UE 115 may be moving into the coverage area of the target base station 105, or the target base station 105 may be capable of providing better service for the UE 115 or relieving the source base station 105 of excess load. The transition may be referred to as a "handover." Prior to a handover, the source base station 105 may configure the UE 115 with procedures for measuring the signal quality of neighboring base stations 105. The UE 115 may then respond with a measurement report. The source base station 105 may use the measurement report to make the handover decision. The decision may also be based on radio resource management (RRM) factors such as network load and interference mitigation. When the handover decision is made, the source base station 105 may send a handover request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a handover request acknowledge message to the source base station 105, which may include RRC information to be passed on to the UE 115. The source base station 105 may then direct the UE 115 to perform the handover, and pass a status transfer message to the target base station with Packet Data Convergence Protocol (PDCP) bearer status information. The UE 115 may attach to the target base station via a random access channel (RACH) procedure.

An MME may be a key network node for exchanging control information with UEs 115. For example, the MME may be involved in the network connection activation/deactivation process and may also be involved in authenticating a user in coordination with an home subscriber server (HSS). Non Access Stratum (NAS) signaling—which may be used for the establishment of communication sessions and for maintaining continuous communications with UEs 115 as they move—may be initiated and/or directed at the MME. The MME may also allocate a temporary identity to a UE 115. For example, the MME may allocate a globally unique temporary identity (GUTI) to a UE 115 that includes identification information for the MME as well as a temporary identity for the UE 115. A GUTI may minimize the frequency with which a persistent identity, e.g., an international mobile subscriber identity (IMSI), is transmitted within the network. The MME may also check whether a UE 115 is authorized to camp on a service provider's Public Land Mobile Network (PLMN), and may manage security keys for non-access stratum (NAS) signaling such as attachment procedures for UEs 115 and handles the security key management.

In some cases, a UE 115 may determine that a radio link has failed and initiate a radio link failure (RLF) procedure. For example, an RLF procedure may be triggered upon an RLC indication that a maximum number of retransmissions has been reached, upon receiving a maximum number of out-of-sync indications, or upon radio failure during a RACH procedure. In some cases (e.g., after reaching the limit for out-of-sync indications) a UE 115 may initiate a timer and wait to determine whether a threshold number of in-sync indications are received. If the number of in-sync indications exceeds the threshold prior to expiration of the timer, the UE 115 may abort the RLF procedure. Otherwise, the UE 115 may perform a RACH procedure to regain access to network. The RACH procedure may include transmitting an RRC connection re-establishment request including the cell radio network temporary identity (C-RNTI), the cell identification (ID), security verification information, and a cause for re-establishment. The base station 105 receiving the request may respond with either an RRC connection re-establishment message or an RRC connection re-establishment rejection. The RRC connection re-establishment message may contain parameters for establishing a signaling radio bearer (SRB) for the UE 115 as well as information for generating a security key. Once the UE 115 receives the RRC connection establishment message it may implement the new SRB configuration and transmit an RRC connection re-establishment complete message to the base station 105.

Figure 2:
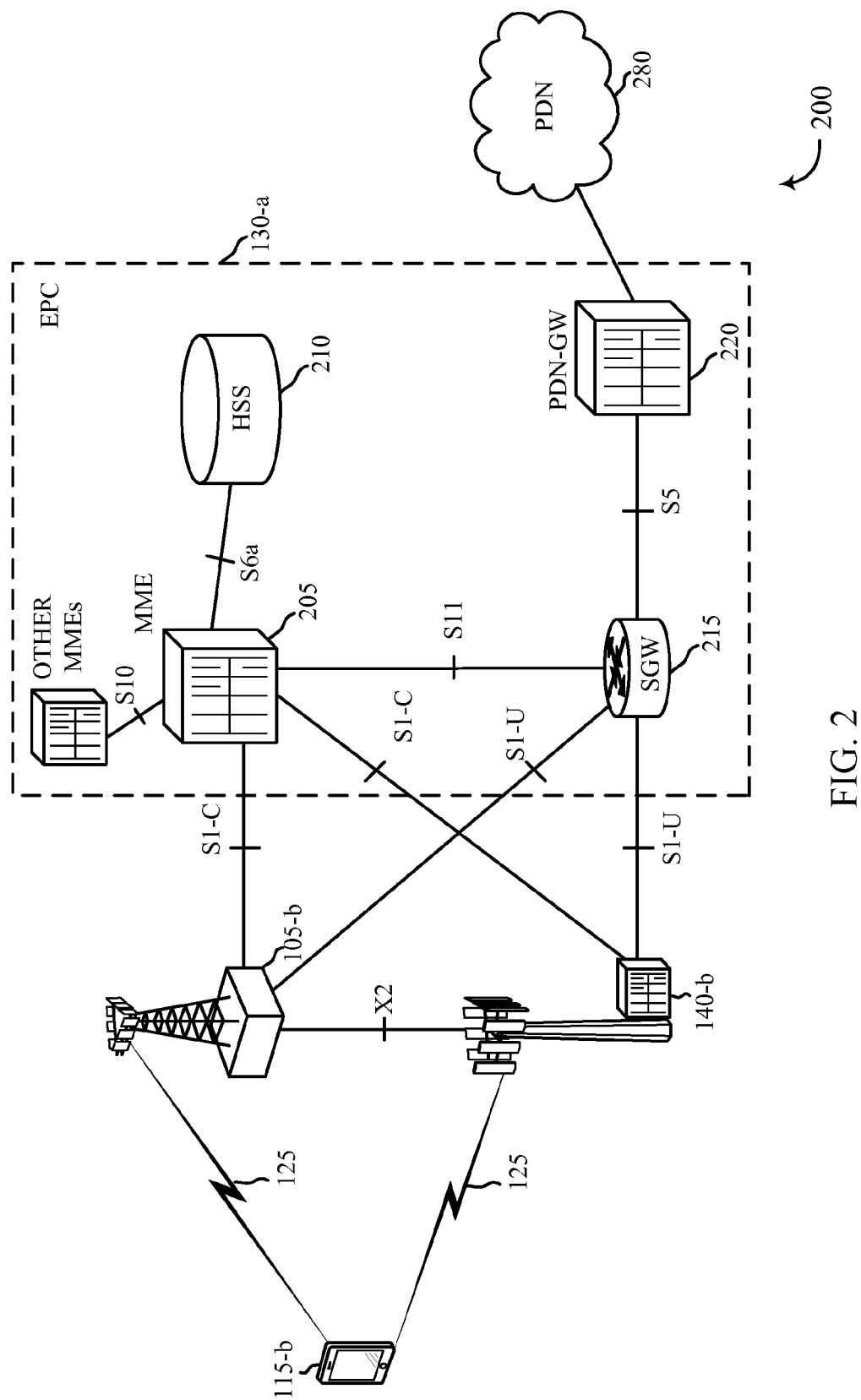
FIG. 2 illustrates an example of a wireless communications subsystem for service specific air interface selection in accordance with various aspects of the present disclosure.

Referring now to FIG. 2, a diagram of a wireless communication system 200 is shown. The wireless communication system 200 may include a UE 115-b, LTE base station network equipment 105-b, an mmW base station network equipment 140-b, an evolved packet core (EPC) 130-a, and an IP network 245 (e.g., the Internet and/or an IP network associated with a cellular provider). The UE 115-b, LTE base station network equipment 105-b, mmW base station network equipment 140-b, and EPC 130-a may be respective examples of the UE 115, base station network equipment 105, mmW base station network equipment 140 and core network 130 of FIG. 1.

The UE 115-b may communicate with the LTE base station network equipment 105-b using a first air-interface. Additionally or alternatively, the UE 115-b may also simultaneously communicate with the mmW base station network equipment 140-b using a second air interface. The LTE base station 105-a and mmW base station 140-b may be capable of providing the UE 115-b with access to the evolved packet core 130-a using the aggregation of carriers for the different RATs. The evolved packet core 130-a may include a mobility management entity 205, a home subscriber server (HSS) 210, a serving gateway (SGW) 215, and a packet data network (PDN) gateway (PDN-GW) 220, as defined by the Evolved Packet System (EPS) architecture standardized by the 3GPP organization. In some examples, one or more of these nodes may be implemented by the same device.

The MME 205 may be the control node that processes the signaling between the UE 115-b and the EPC 130-a. Generally, the MME 205 may provide bearer and connection management. The MME 205 may, therefore, be responsible for idle mode UE tracking and paging, bearer activation and deactivation, and SGW selection for the UE 115-b. The MME 205 may communicate with the LTE base station 105-b and mmW base station 140-b over an S1-MME interface. The MME 205 may additionally authenticate the UE 115-a and implement Non-Access Stratum (NAS) signaling with the UE 115-b. In some examples of the present disclosure, the MME 205 may transmit bearer context NAS to the UE 115-b.

The HSS 210 may, among other functions, store subscriber data, manage roaming restrictions, manage accessible access point names (APNs) for a subscriber, and associate subscribers with MMEs 205. The HSS may communicate with the MME over an S6a interface defined by defined by the Evolved Packet System (EPS) architecture standardized by the 3GPP organization.

All user IP packets transmitted over the LTE base station 105-*b* and mmW base station 140-*b* may be transferred through the SGW 215, which may be connected to the PDN-GW 220 over an S5 signaling interface and the MME 205 over an S11 signaling interface. The SGW 215 may reside in the user plane and act as a mobility anchor for inter-air interface handovers and handovers between different access technologies. The PDN-GW 220 may provide UE IP address allocation as well as other functions.

The PDN-GW 220 may provide connectivity to one or more external packet data networks, such as IP network 245, over an SGi signaling interface. The IP network 245 may include the Internet, an Intranet, an IP Multimedia Subsystem (IMS), a Packet-Switched (PS) Streaming Service (PSS), and/or other types of PDNs.

In the present example, the UE 115-*b* may independently support signaling radio bearers and data radio bearers for each air interface (e.g., mmW and LTE). In one example, the UE 115-*b* may transmit a NAS service request to the MME 205. The NAS service request message may include an identifier that indicates at least one air interface type supported by the UE 115-*b*. Additionally or alternatively, the LTE base station 105-*b* and/or mmW base station 140-*b* may include the air interface type into the S1 container that may carry the NAS service request to the MME 205. The reception of the NAS service request may allow the MME 205 to configure only those S1-bearers for the UE 115-*b* that may be permitted according to the Evolved Packet System (EPS) bearer policy. In some examples, the EPS bearer may be a connection-oriented transmission network that may require a virtual connection or tunnel between two endpoints (e.g., a UE 115-*b* and SGW 215 or PDN-GW 220) before any traffic may be transmitted between the endpoints.

In other examples, the LTE base station 105-*b* and/or mmW base station 140-*b* may receive an Initial Context Setup Request (ICSR) message from the MME 205 to establish the S1-bearers and radio bearers that may be compliant with the EPS bearer policies. Based on the reception of the ICSR message from the MME 205, at least one of the LTE base station 105-*b* and/or mmW base station 140-*b* may conduct the radio bearer establishment with the UE 115-*b*.

In accordance with the present disclosure, the UE 115-*b* may transmit NAS service requests independently on each of the first and second air interfaces. In some examples, the NAS service request may be sent in parallel directed to the same MME 205. To this point, the UE 115-*b* may insert the same Globally Unique Mobility Management Entity Identifier (GUMMEI) in both NAS service requests that may identify the MME 205. In some examples, each NAS service request transmitted over each of the available air interface may include a parameter identifying the respective air-interface technology type(s). As a result, the MME may set up S1-bearers on each of the identified air-interface(s) based in part on the bearers' policies. In other examples, the UE 115-*b* may establish radio bearers on one air-interface technology with one base station of a first air-interface type while exchanging data with another base station of a second air-interface type. In yet another example, the UE 115-*b* may simultaneously exchange data on one set of bearers using a first air-interface (e.g., LTE) with a first base station, and exchange data on another set of bearers using a second air-interface with a second base station. In some examples of the present disclosure, the security keys used on multiple air interfaces may be different. However, in some instances, each security key may be derived from the same session key, e.g., Kasme. Additionally or alternatively, the security keys for each of the first and second air-interfaces may be based on different next-hop values.

In some examples, at least one or both of the base stations (e.g., eNB or mmW) supporting a first air interface and/or a second interface may configure the UE 115-*b* to perform signal quality measurements for both the eNB 105-*b* and mmW base station 140-*b* by transmitting a measurement configuration message to UE 115-*b*. In some instances, the base stations may provide information on measurement algorithms and trigger conditions for multiple air interface technologies. The UE 115-*b*, upon receiving the measurement configuration message, may calculate signal quality measurements for multiple air interfaces. For example, the UE 115-*b*, upon receiving a measurement configuration message, from eNB 105-*b*, may measure signal quality between the UE 115-*b* and eNB 105-*b* in addition to measuring signal quality between the UE 115-*b* and mmW base station 140-*b*. Thus, the UE 115-*b* may conduct signal quality measurements for multiple air interfaces based on receiving a measurement configuration message from at least one base station 105-*b* and/or 140-*b*.

In accordance with the present disclose, the UE 115-*b* may, either periodically or upon detecting a trigger condition, send measurement reports to each base station 105-*b* and/or 140-*b*. The measurement reports transmitted to each base station may include information regarding all base stations that the UE 115-*b* may be connected to. In some examples, the information may include a first channel quality indicator (CQI) associated with the first base station 105-*b* of a first air interface type (e.g., LTE), and a second CQI associated with the second base station of a second air interface type (e.g., mmW). The UE 115-*b* may transmit both the first CQI and the second CQI to the first base station 105-*b* and the second base station 140-*b*. Thus, transmitting measurement reports associated with multiple base stations of different air-interface types may ensure that the receiving base station(s) may initiate an inter air-interface bearer handover.

Figure 3A:
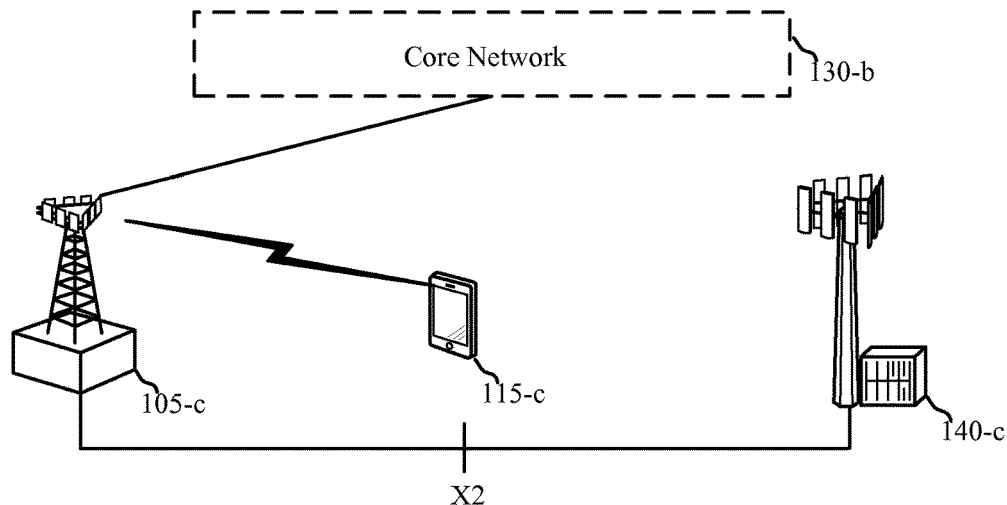
FIGS. 3A to 3F illustrates examples of various aspects of service specific air interface selection in accordance with various aspects of the present disclosure.
Figure 3B:
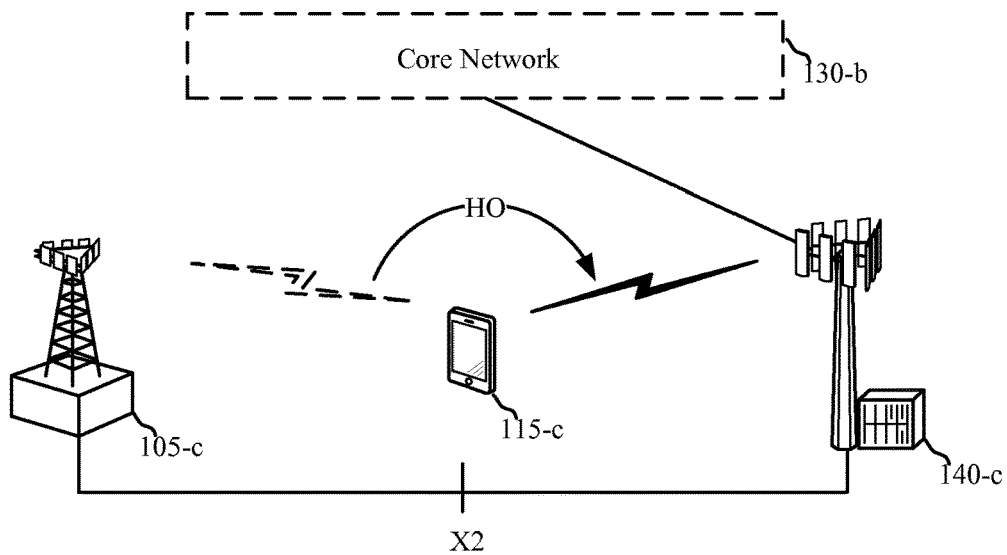

Referring now to FIGS. 3A and 3B diagrams of a wireless communications system 300 and 300 are shown before and after a handover event, respectively. The wireless communications system 302 may include a UE 115-*c*, an LTE base station 105-*b* of the first air-interface type, a mmW base station network equipment 140-*c* of the second air-interface type, and a core network 130-*b*. The UE 115-*c* may be an example of one or more of the UEs 115 described above with reference to FIGS. 1-2. The LTE base station 105-*c* may be examples of one or more of the base station network equipments 105 described above with reference to the previous FIGS. 1-2. The mmW base station 140-*c* may be examples of one or more of the mmW base station network equipments 140 described above with reference to the previous FIGS. 1-2. The core network 130-*b* may be an example of one or more of the core networks 130 described above with reference to FIGS. 1-2.

Generally, FIGS. 3A to 3F illustrate examples of various aspects of service specific air interface selection 300 in accordance with various aspects of the present disclosure. Referring first to FIG. 3A, before a handover event occurs, the UE 115-*c* may communicate with the LTE base station network equipment 105-c. The UE 115-c may communicate data supported by the same one or more EPC bearers over the LTE. As discussed above, the EPC bearer(s) may be set up at the eNB one element of the LTE base station network equipment 105-c such that control signaling and user plane data related to the EPC bearer(s) may be communicated between UE 115-c and the core network 130-c using the LTE RAT.

Referring now specifically to FIG. 3B, the LTE wireless link between the UE 115-c and the LTE base station network equipment 105-c may be handed over from the LTE base station 105-c to the mmW base station 140-c. In some examples, at least one of the UE 115-c, the LTE base station 105-c, or the mmW base station 140-c may detect a handover event indicating that the handover is about to occur or has already occurred. Based on this detected handover event, network traffic routing rules of one or more nodes of the wireless communications system 300 may be adapted. That is, at least one of the UE 115-c, the LTE base station 105-c, or the mmW base station 140-c may update routing rules for EPC bearer-related traffic between the UE 115-c and the core network 130-b. The updated routing rules may direct EPC bearer traffic that would have been associated with LTE prior to the handover to mmW, thereby avoiding a loss of packets and reduced user experience following the handover.

The determination of the handover may occur when a handover event is identified either before or after the actual handover. In examples where the handover event indicates that a handover is imminent, but has not yet occurred, the network traffic routing rules may be updated to move LTE traffic related to the EPC bearer(s) to the mmW carrier before the handover, thereby avoiding disruptions caused by the handover. In examples where the handover event indicates that the handover has already occurred, the network traffic routing rules may be updated to move LTE traffic related to the bearer(s) to the mmW carrier or to a new carrier.

In certain examples, the handover event may include a measurement report from the UE 115-c transmitted to and identified by the LTE base station 105-c. The measurement report may, for example, indicate that the signal strength of a different air-interface type (i.e., a potential handover target), in this case the mmW base station network equipment 140-c, is higher than that of the LTE base station 105-c.

In additional or alternative examples, the handover event may include a handover instruction from the LTE base station 105-c, as received and identified by the UE 115-c. In certain examples, this handover command may include a Radio Resource Control (RRC) connection reconfiguration message instructing the UE 115-c to initiate a handover to a specified target cell, in this case the mmW base station network equipment 140-c. The handover command may be in response to the transmission of the above described measurement report by the UE 115-c.

In some examples, the handover request message may be sent directly from a source base station (e.g., 105-c) of the first air-interface type to a target base station (e.g., 140-c) of a second air-interface type. It should be understood that although the present illustration discusses handover from an LTE base station to a mmW base station, the present disclosure may also be applicable for conducting handover from a mmW base station to an LTE base station. In such instance, the source base station may operate over mmW, while the target base station may operate over an LTE communication. Now referring back to FIG. 3B, the message sent from a source base station to the target base station may include information related to the subscriber's policy type of the UE 115-c and may list the bearers that may be handed over in compliance with such policy.

Receiving information associated with the handover request message may allow the target base station (e.g., 140-c) of a different air-interface type to verify the target base station supports the bearers identified in the handover request message. In the event that the target base station 140-c supports the identified bearers, the target base station 140-c may allocate resources for a handover based on the handover request message. In some examples, the handover request message may further include the security key material used for secure data transfer with the UE 115-c. The security key material may comprise Kasme, for example, and next-hop parameters. Such information may allow the target base station 140-c to derive a new key in the event of successful handover.

Upon receiving the handover request message, the target base station 140-c may issue a handover request acknowledgment message directly to the source base station over backhaul links (e.g., an X2 interface). The source base station and the target base stations may be of different air interface types. In some examples, the acknowledgment message may include information for a subsequence RRC connection reconfiguration message pertaining to the target base station's air interface type. This message may relate to the radio bearers that may be handed over between the two air-interface technologies in compliance with the policy forwarded by the source base station 105-c.

In response to the handover request acknowledgment message, the source may base station 105-c may send to the UE 115-c an RRC-Connection-Reconfiguration message on the first air interface type. This message may include updates to the security key materials that may have been forwarded to the target base station 140-c. For example, the security key materials may include next-hop parameter. The source base station 105-c may also forward to the target base station 140-c the present packet sequence number, such as the PDCP sequence number, and all buffered packets for bearers to be handed from the source base station 105-c to the target base station 140-c.

Based on the RRC-Connection-Reconfiguration message, the UE 115-c may conduct an inter-air-interface technology handover for a subset of bearers to the target base station 140-c as specified in the RRC-Connection-Reconfiguration message while the UE 115-c continues data exchange with the source base station 105-c for the remaining subset of bearers. In some examples, the UE 115-c, upon completing the inter-air-interface technology handover, may issue a RRC-Connection-Reconfiguration-Complete message to the target base station 140-c. Upon receiving the RRC Connection Reconfiguration Complete message, the target base station 140-c may initiate data exchange on the second air-interface type for the bearers handed over using the a security key. In some examples, the target base station 140-c may forward packets received directly from the source base station 105-c over a backhaul link (e.g., X2 interface) to the UE 115-c.

In accordance with the present disclosure, the target base station 140-c may transmit, to an MME in the core network 130-b, a path switch request message. The path switch message may include the bearers that may need to be switched from the source base station 105-c to the target base station 140-c. Additionally or alternatively, the path switch message may also include the target base station's air interface type and a subscriber identification (ID). As a result, the MME may verify that the bearer path switch is compliant with the subscriber's policy.

In some examples, the target base station 140-c may receive a path switch request acknowledgment message from the MME of the core network 130-b. The path switch request acknowledgment message may contain an update to the security parameters such as the next hop count. The target base station 140-c may store the next hop count for a subsequent handover to a subsequent third base station. The third base station may be, for example, an mmW base station or an LTE base station.

In accordance with one mode of the present disclosure, a UE 115-c may encounter a RLF on at least one air interface technology, and thus the UE 115-c may conduct a forward handover to a target base station supporting a different air interface technology. In such an instance, the UE 115-c may conduct an RRC Connection Reestablishment procedure at the target base station. In some examples, the UE 115-c may include information associated with the source base station 105-c to the target base station. Such information include source base station's Cell Global Identity (CGI). In response, the target base station may send a request message to the source base station to retrieve the current packet sequence number (e.g., PDCP sequence number) and all buffered packets to ensure lossless connection continuity. It should be understood by those skilled in the art that intra-technology handover may occur independently on the corresponding bearer subsets. For instance, LTE-compliant bearers may be handed over between LTE base stations while mmW-compliant bearers may be handed over between mmW base station.

Figure 3C:
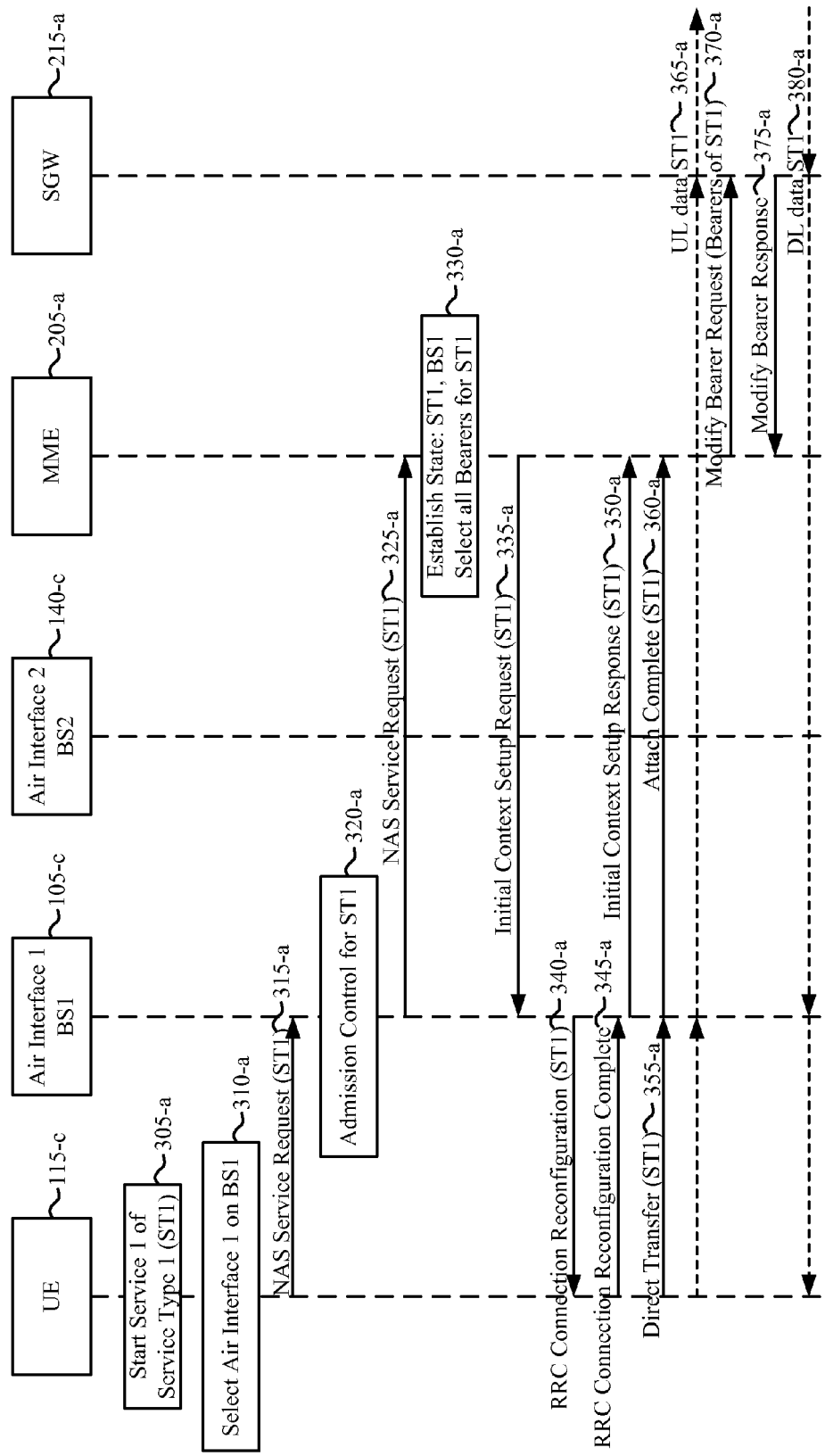
Figure 3D:
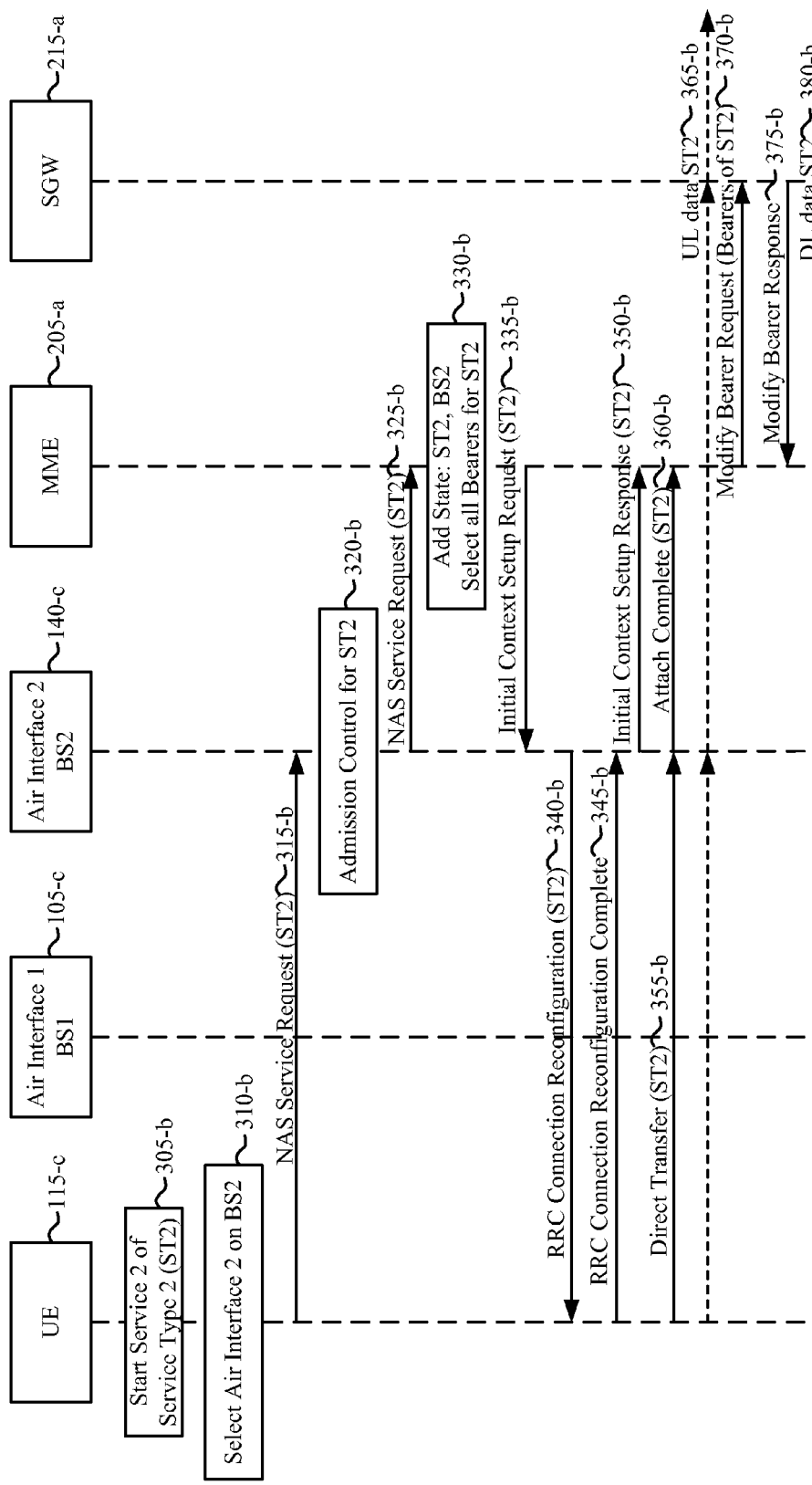

Referring now to FIGS. 3C and 3D, first and second, respectively, UE-initiated service requests are used to establish an independent connection to a core network. Generally, each base station interconnects to the MME via an S1-C interface and to an S-GW via the S1-U interface. The UE 115-c is configured to hold a grouping of services to service types as well as an air-interface priority table for each service type. In the examples illustrated in FIGS. 3C and 3D, the UE may establish two concurrent connections to the core network, where each connection uses an independent RRC radio configuration and supports a set of services of a particular service type.

For example and referring specifically to FIG. 3C, at 305-a the UE 115-c mat start a service of a service type, e.g., service 1 of a service type 1. At 310-a, when starting a service, the UE 115-c selects the most appropriate (air interface and base station) pair for this service type. For example, the UE 115-c may use beacon signal measurements on air interfaces of surrounding BSs, in this example, base station 105-c. At 315-a, the UE 115-c establishes signaling bearers to base station 105-c and sends a NAS Service Request message to base station 105-c that has been selected for this service type. The NAS Service Request message may include an identifier of the service type, e.g., a service type ID.

At 320-a, the base station 105-c performs admission control for the service type. For example, the base station 105-c may apply service-type specific admission control by evaluating the service type identifier contained in the NAS Service Request message. At 325-a, the base station 105-c may forward the NAS Service Request message to MME 205-a.

At 330-a, the MME 205-a may establish the state and select all bearers for the service type. For example, the MME 205-a receiving the NAS Service Request message may cache the base station 105-c as the location for this service type together with the service type ID. The MME 205-a may determine and select all bearer(s) that belong to this service type. At 335-a, the MME 205-a may transmit an Initial Context Setup Request message to base station 105-c for the service type. For example, the message may include or otherwise identify the service type and include bearer(s) that pertain to this service type.

At 340, the base station 105-c may transmit an RRC Connection Reconfiguration message to the UE 115-c. The RRC Connection Reconfiguration message may provide for the base station 105-c to establish a radio configuration with the UE 115-c and may include the radio bearer(s) indicated by the MME 205-a as well as the service type ID. The RRC Connection Reconfiguration message may provide to the UE 115-c measurement configuration that advantageously matches that of the air-interface priority list for this service type. At 345-a, the UE 115-c may respond by transmitting a RRC Connection Reconfiguration Complete message to the base station 105-c. At 350-a, the base station 105-c transmits an Initial Context Setup Response message to the MME 205-a.

At 355-a, the UE 115-c also transmits a Direct Transfer message to the base station 105-c for the service type. The Direct Transfer message may include the service type ID. At 360-a, the base station 105-c may forward this information in an Attach Complete message to the MME 205-a that also includes the service type ID. At 365-a, the UE 115-c is configured to send UL data traffic for services that pertain to this service type.

At 370-a and based on receipt of the Attach Complete message, the MME 205-a may transmit a Modify Bearer Request message to the S-GW 215-a that includes all bearer(s) pertaining to the services of the service type. The S-GW 215-a may activate these bearer(s) and replies at 375-a with a Modify Bearer Response message to the MME 205-a. At 380-a, the UE 115-c is configured to support receipt of DL traffic for services pertaining to this service type.

Referring specifically to FIG. 3D, the UE 115-c may perform the same procedures as outlined with respect to FIG. 3C to establish a second connection with base station 140-c for a second service (e.g., service type 2). The procedures outlined in FIG. 3D may be performed concurrently, in some examples, with the procedures outlined in FIG. 3C. For example, the UE 115-c may follow the procedures outlined in FIG. 3D and establish a second connection for services pertaining to a second service type by selectin a second (air interface and base station) pair which may be best suited for this second service type, e.g., base station 140-c for the service type 2.

Generally, the inclusion of the service type ID into various signaling messages may provide for concurrent or sequential service requests pertaining to different service types between the UE 115-c and the MME 205-a. In some aspects, all states on UE 115-c, base stations 105-c and/or 140-c, and MME 205-a may be established with respect to a (UE, service type) pair which allows grouping bearer(s) by service type and assigning each group to the service type specific air interface and base station. In an example where the UE 115-c simultaneously supports multiple PDN contexts, bearer(s) pertaining to multiple PDN contexts may be grouped together under the same service type.

Figure 3E:
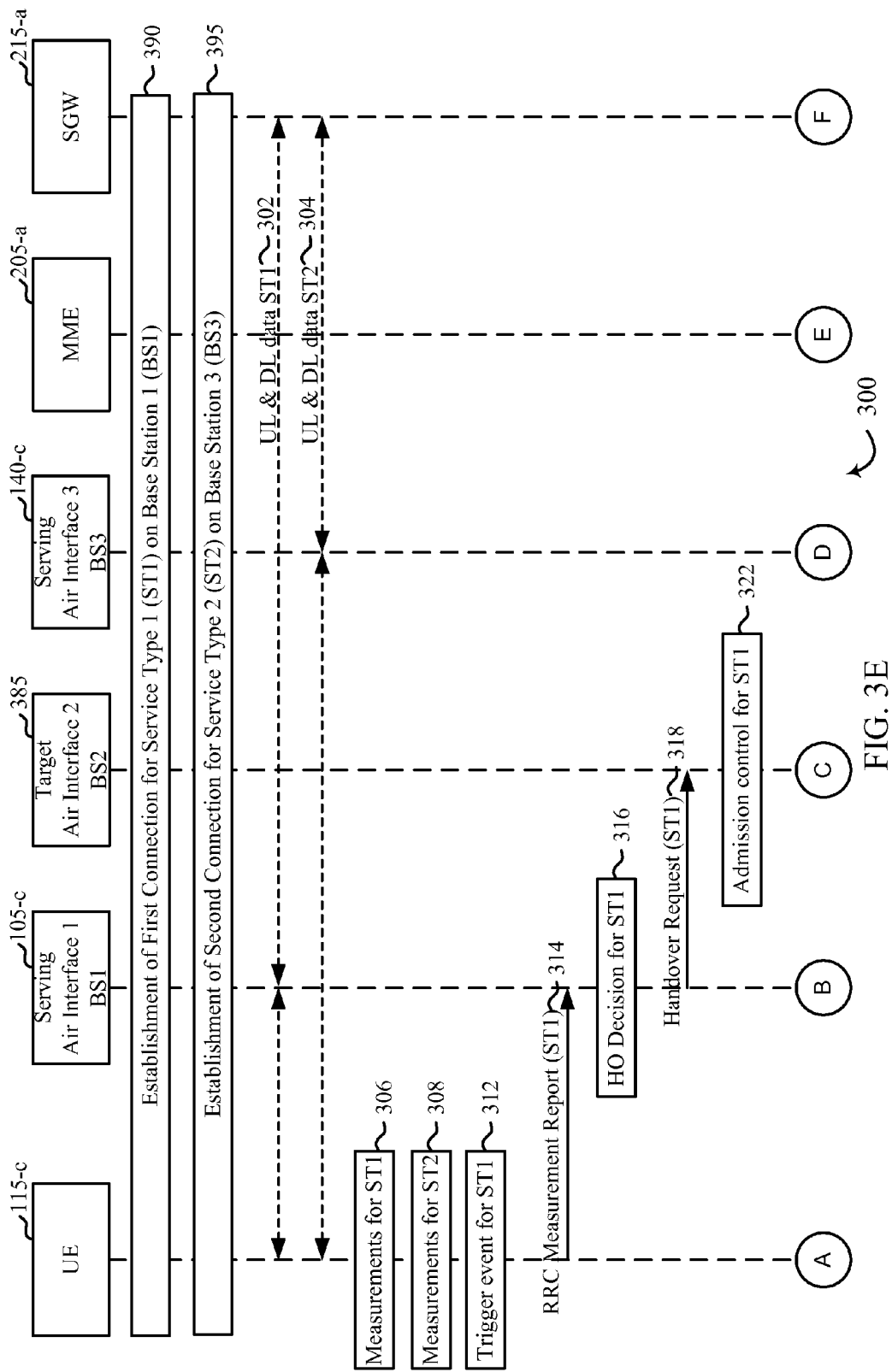
Figure 3E:
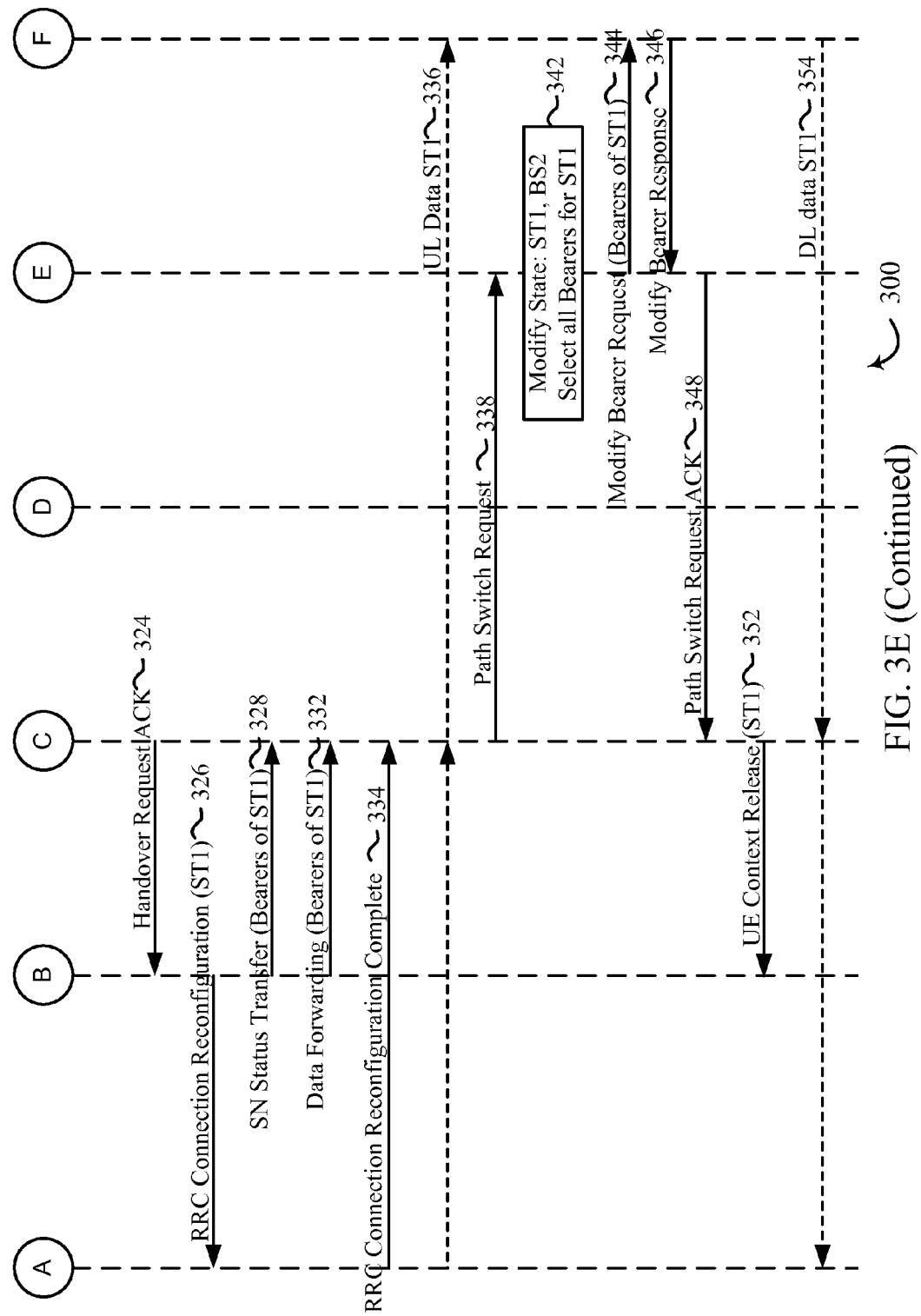

Referring now to FIG. 3E, a service type specific handover is illustrated where UE 115-c performs a handover for one of two concurrent connections supporting different service types. The UE 115-c is configured with a separate radio configuration for each of the connections and performs measurements and evaluates trigger events according to the measurement configurations of radio configurations.

At 390, the UE 115-c has established a connection for service type 1 with base station 105-c using aspects of the above-described techniques. At 395, UE 115-c has established a connection for service type 2 with base station 140-c. At 302 and 304, UE 115-c performs UL and DL data traffic for service type 1 with base station 105-c and for service type 2 with base station 140-c, respectively.

At 306, UE 115-c may perform measurements for service type 1 and, at 308, perform measurements for service type 2 according to the respective measurement configurations for the radio configuration. At 312, the UE 115-c detects or identifies a trigger event has occurred for service type 1 (e.g., a RLF event). At 314, the UE 115-c responds by transmitting a RRC Measurement Report to base station 105-c for the service type 1, e.g., a RRC Measurement Report message to the service base station that supports the radio configuration for this service type. The UE 115-c may include a service type ID in the RRC Measurement Report message.

At 316, base station 105-c may make a handover decision for the UE 115-c. For example, the base station 105-c may decide to conduct a handover of the bearer(s) pertaining to this service type to a target air interface on a target base station, e.g., target base station 385. When a decision to handover occurs, X2 and/or S1 handover signaling message may be used with the addition that some messages include the service type ID to provide for independently conducting handovers of bearer(s) pertaining to different service types.

For example and at 318, the base station 105-c may transmit a Handover Request message to target base station 385 over an X2 interface. The Handover Request message may include the service type ID, which target base station 385 may use at 322 to apply appropriate admission control, allocate resources, and prepare a radio configuration for the radio bearer(s) pertaining to the service type.

At 324 (shown on the continuation sheet), the target base station 385 may respond by transmitting a Handover Request Acknowledgement message to base station 105-c. The Handover Request Acknowledgement message may include the new radio configuration for this service type. At 326, base station 105-c forwards this information to UE 115-c in a RRC Connection Reconfiguration message. The RRC Connection Reconfiguration message may be signaled to the UE 115-c on a signaling radio bearer. The UE 115-c uses the RRC Connection Reconfiguration message to terminate the data radio bearers on base station 105-c and access the target base station 385. At 328 and 332, base station 105-c forwards the target base station serial number status transfer and cached data for radio bearer(s) pertaining to this service type, respectively. At 334, the UE 115-c accesses the target base station 385 and transmits a RRC Connection Reconfiguration Complete message to target base station 385. This generally completes the service type specific handover and, at 336, the UE 115-c is configured to send UL data traffic for this service type via target base station 385 (which is now the new service base station for this service type).

At 338, the target base station 385 transmits a Path Switch Request message to MME 205-a, which may include the service type ID. At 342, the MME 205-a may use service type ID to modify the state and selection of radio bearer(s) for the service type. For example, MME 205-a may selectively switch radio bearer(s) to base station 385 with are associated with the service type. To that end and at 344, the MME 205-a may transmit a Modify Bearer Request to S-GW 215-a. The S-GW 215-a may respond with a Modify Bearer Response message that transfers the bearer(s) to base station 385. The MME 205-a may transmit a Path Switch Request message at 348 to base station 385. At 352, base station 385 may transmit a UE Context Release message to the old service base station (e.g., base station 105-c) for the service type. Accordingly and at 354, the UE 115-c is configured for DL traffic for this service type via base station 385.

It is to be understood that during the above-described handover techniques, services supported by other connections (e.g., with base station 140-c) may continue to run on their respective air interfaces and via the respective base stations.

In some aspects where a RLF occurs before the RRC Radio Reconfiguration message arrives at UE 115-c, the UE 115-c may reestablish the radio configuration at a target air interface on a target base station using a RRC Connection Reestablishment message that includes the service type ID. That my provide for the target base station to conduct admission control, allocate the necessary resources, and conduct a path switch for this service type.

Figure 3F:
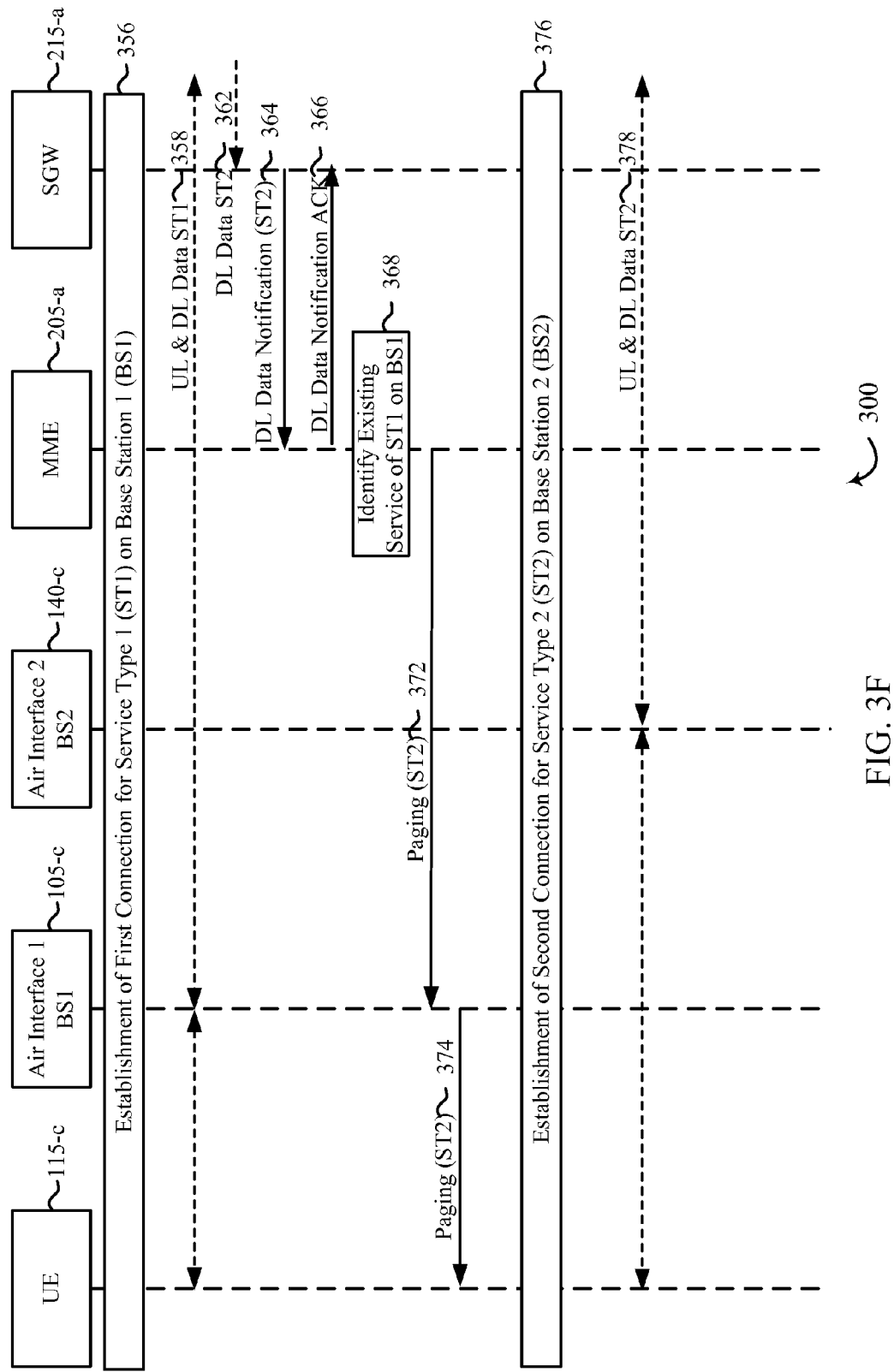

Referring now to FIG. 3F, a network based connection establishment for a service type is illustrated where UE 115-c sustains services pertaining to a first service type using a first connection at a first air interface on a first base station when a packet arrives on the network for the UE pertaining to a bearer of a second service type. Since no E-RAB exists for this bearer, the packet may be forwarded to the MME in a DL Data Notification message.

For example, at 356, the UE 115-c may have established a first connection for a service type 1 with base station 1050c. At 358, the UE 115-c may communicate downlink and/or uplink data traffic for the first service type via the base station 105-c. At 362, the S-GW 215-a may receive downlink data that pertains to UE 115-c that pertains to a bearer of a second service type. At 364, the S-GW 215-a may transmit a DL Data Notification message to MME 205-a. The MME 205-a responds at 366 with a DL Data Notification Acknowledgement message to S-GW 215-a. At 368, the MME 205-a may identify the existing service of service type 1 for base station 105-c. For example, MME 205-a may determines that the packet belongs to the second service type and identifies that the UE 115-a already sustains a connection for the first service type. Consequently, the MME 205-a may transmit a Paging message to base station 105-c. At 374, base station 105-c forwards the Paging message over a signaling bearer that has already been established for the first service type. At 376 and based on receiving the Paging message, UE 115-c may establish a second connection for service type 2 with base station 140-c. For example, UE 115-c may initiate a NAS Service Request using an air interface on a base station that is appropriate for the service type. Accordingly and at 378, the UE 115-c may be configured to support uplink and downlink traffic for service type 2 via base station 140-c.

While the above-description refers to a service type ID, it is to be understood that various signaling messages may include an explicit listing of the services.

Moreover, while the above-description generally refers to a base station, it is to be understood that a base station may also refer to a physically independent access point with individual interface to a core network. A base station may also refer to a cell or a subset of cells connected together with other cells to a common backplane which provides connectivity to a core network. A base station may further refer to one or a subset of radio heads connected to a physically independent access point with interface to a core network.

Figure 4:
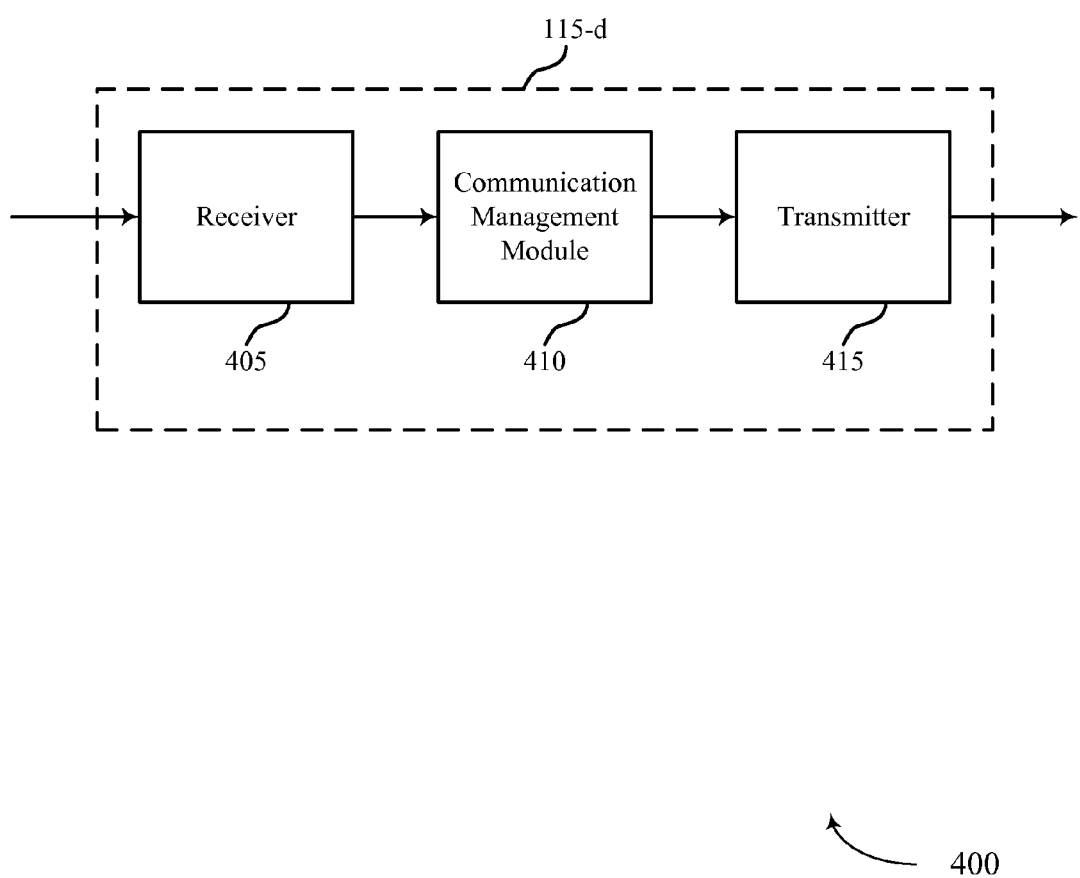
FIG. 4 shows a block diagram of a user equipment (UE) configured for service specific air interface selection in accordance with various aspects of the present disclosure.

FIG. 4 shows a block diagram 400 of a UE 115-*d* configured for service-specific air interface selection in accordance with various aspects of the present disclosure. The UE 115-*d* may be an example of aspects of a UE 115 described with reference to FIGS. 1-3. The UE 115-*d* may include a receiver 405, a communication management module 410, and/or a transmitter 415. The UE 115-*d* may also include a processor. Each of these components may be in communication with each other.

The components of the UE 115-*d* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 405 may receive information such as packets, user data, and/or control information associated with various information channels (e.g., control channels, data channels, and information related to service-specific air-interface selection, etc.). Information may be passed on to the communication management module 410, and to other components of the UE 115-*d*.

The communication management module 410 may establish a first session with a first base station over a first air interface, establish a second session with a second base station over a second air interface, identify a type of a first service to perform over the first air interface or the second air interface, select the first air interface or the second air interface based at least in part on the identified type of the first service, and perform the first service over the selected air interface.

In some aspects, the communication management module 410 may receive a first radio configuration for a first service on a first air interface to a first base station, receive a second radio configuration for a second service on a second air interface to a second base station, and transmit, based on the first radio configuration, a first measurement report to the first base station over the first air interface, the first measurement report comprising information related to at least one of the first air interface and the second air interface.

The transmitter 415 may transmit signals received from other components of the UE 115-*d*. In some embodiments, the transmitter 415 may be collocated with the receiver 405 in a transceiver module. The transmitter 415 may include a single antenna, or it may include a plurality of antennas. In some examples, the transmitter 415 may transmit the measurement report to the first base station and the second base station based at least in part on the detecting. In some examples, the transmitter 415 may periodically transmitting the measurement report to the first base station and the second base station base at least in part on the measurement configuration message.

Figure 5:
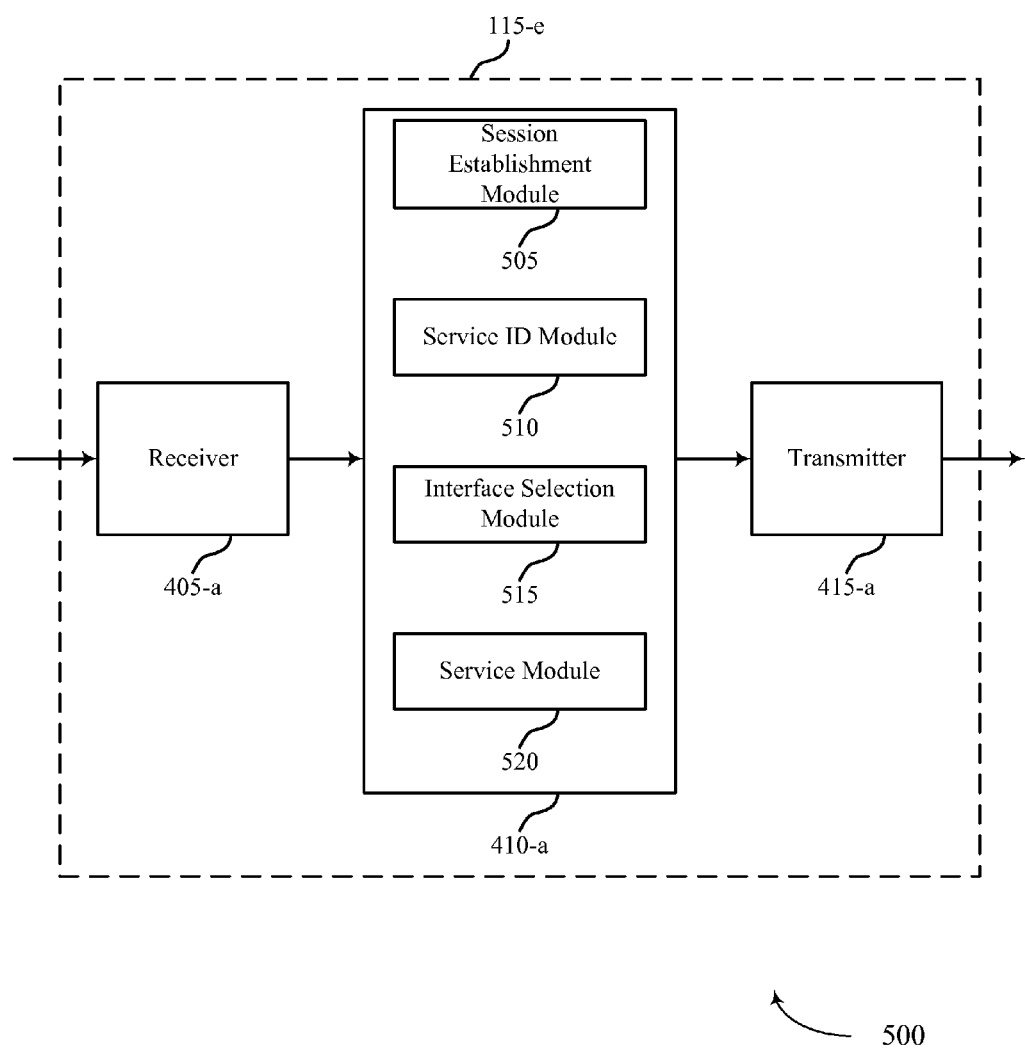
FIG. 5 shows a block diagram of a UE configured for service specific air interface selection in accordance with various aspects of the present disclosure.

FIG. 5 shows a block diagram 500 of a UE 115-*e* for service-specific air interface selection in accordance with various aspects of the present disclosure. The UE 115-*e* may be an example of aspects of a UE 115 described with reference to FIGS. 1-4. The UE 115-*e* may include a receiver 405-*a*, a communication management module 410-*a*, and/or a transmitter 415-*a*. The UE 115-*e* may also include a processor. Each of these components may be in communication with each other. The communication management module 410-*a* may also include a session establishment module 505, a service ID module 510, an interface selection module 515, and a service module 520.

The components of the UE 115-*e* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 405-*a* may receive information which may be passed on to the -*a*, and to other components of the UE 115-*e*. The communication management module 410-*a* may perform the operations described above with reference to FIG. 4. The transmitter 415-*a* may transmit signals received from other components of the UE 115-*e*.

The session establishment module 505 may establish a first session with a first base station over a first air interface as described above with reference to FIGS. 2-3. The session establishment module 505 may also establish a second session with a second base station over a second air interface as described above with reference to FIGS. 2-3. In some examples, the first session and the second session are established using a single MME. Additionally or alternatively, the first session and the second session are established using a single SGW. The session establishment module 505 may receive a first radio configuration for a first service on a first air interface to a first base station as described above with reference to FIGS. 2-3. The session establishment module 505 may receive a second radio configuration for a second service on a second air interface to a second base station as described above with reference to FIGS. 2-3.

The service ID module 510 may identify a type of a first service to perform over the first air interface or the second air interface as described above with reference to FIGS. 2-3. The service ID module 510 may also identify a type of a second service to perform over the first or the second air interface as described above with reference to FIGS. 2-3.

The interface selection module 515 may select the first air interface or the second air interface based at least in part on the identified type of the first service as described above with reference to FIGS. 2-3. The interface selection module 515 may also select the first air interface or the second air interface based at least in part on the identified type of the second service as described above with reference to FIGS. 2-3. In some examples, selecting the first air interface or the second air interface further comprises identifying bearer specific policy information comprising a first priority value associated with the first air interface and a second priority value associated with the second air interface, comparing the first priority value and the second priority value, and selecting the first air interface or the second air interface based at least in part on the comparison. In some examples, the first air interface may be an LTE air interface and the second air interface may be a millimeter-wave air interface.

The service module 520 may perform the first service over the selected air interface as described above with reference to FIGS. 2-3. The service module 520 may also perform the second service over the air interface selected for the second service as described above with reference to FIGS. 2-3. In some examples, the first service may be performed over the first air interface, and the second service may be performed simultaneously over the second air interface.

In some aspects, the service module 520 may transmit, based on the first radio configuration, a first measurement report to the first base station over the first air interface, the first measurement report including information related to at least one of the first air interface and the second air interface as described above with reference to FIGS. 2-3.

Figure 6:
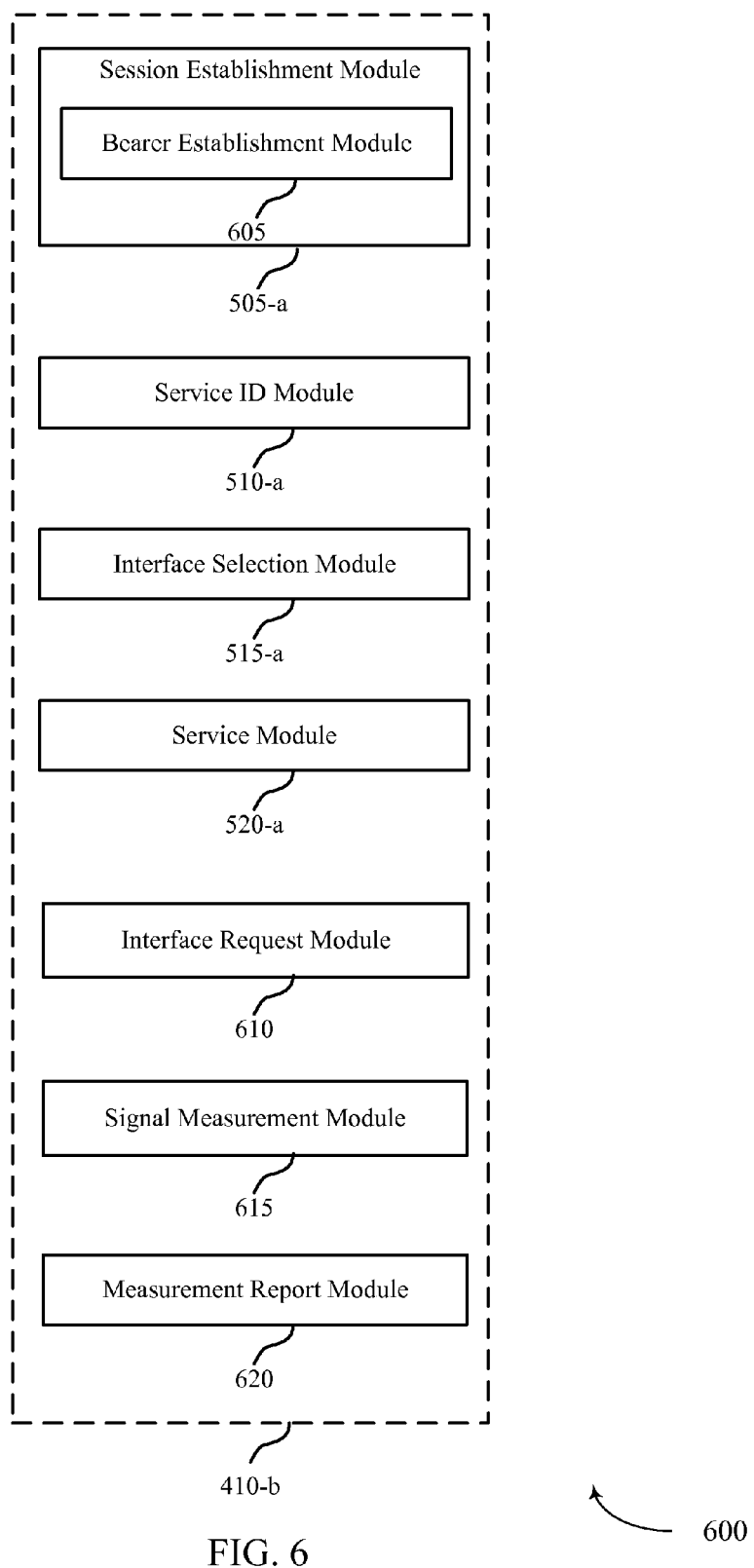
FIG. 6 shows a block diagram of a communications management module configured for service specific air interface selection in accordance with various aspects of the present disclosure.

FIG. 6 shows a block diagram 600 of a communication management module 410-*b* for service-specific air-interface selection in accordance with various aspects of the present disclosure. The communication management module 410-*b* may be an example of aspects of a communication management module 410 described with reference to FIGS. 4-5. The communication management module 410-*b* may include a session establishment module 505-*a*, a service ID module 510-*a*, an interface selection module 515-*a*, and a service module 520-*a*. Each of these modules may perform the functions described above with reference to FIG. 5. The communication management module 410-*b* may also include a bearer establishment module 605, an interface request module 610, a signal measurement module 615 and a measurement report module 620.

The components of the communication management module 410-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The bearer establishment module 605 may be configured such that establishing the first or the second session may include establishing a radio bearer with at least one of the first or the second base station as described above with reference to FIGS. 2-3. The bearer establishment module 605 may also establish the radio bearer with the first base station over the first air interface while simultaneously exchanging data with the second base station over the second air interface as described above with reference to FIGS. 2-3.

The interface request module 610 may be configured such that establishing the first session and the second session further may include transmitting a first request to an MME, the first request indicating a type of the first air interface and transmitting a second request to the MME, the second request indicating a type of the second air interface as described above with reference to FIGS. 2-3. In some examples, the first request and the second request are NAS service requests. In some examples, the first request and the second request each comprise a Globally Unique Mobility Management Entity Identifier (GUMMEI) that identifies the MME.

In some examples, the communication management module 410-*b* may receive a measurement configuration message as described above with reference to FIGS. 2-3. In some examples, the measurement configuration message may comprise information on a measurement algorithm and a trigger condition for at least one of the first air interface and the second air interface. In some embodiments, the measurement algorithm may indicate what objects (e.g., frequencies, cells, radio access technology, etc.) that the communication management module 410-*b* should measure and/or how the management module 410-*b* should take the indicated measurements. In some embodiments, the trigger condition may indicate the trigger conditions for sending a measurement report. In one example, the trigger condition may be an event based trigger such as when an inter-RAT neighbor becomes better than a defined threshold. In another example, the trigger condition may be time based, resulting in periodic reporting.

In some cases, the measurement configuration (e.g., the measurement algorithm and trigger condition, that is contained in the measurement configuration message, for example) may be the same for different base stations or different air-interfaces. For example, the same measurement configuration (e.g., the same measurement algorithm and/or same trigger condition) may be used for measuring different air-interfaces. In other cases, the measurement configuration may be base station specific or air-interface specific (different for different base stations or different air interfaces, for example). For example, a first base station associated with a first air-interface may have a first measurement configuration and a second base station associated with a second air-interface may have a second measurement configuration that is different than the first measurement configuration. In some cases, the differences in the measurement configuration may be based on the differences between different air-interfaces.

The signal measurement module 615 may calculate a first signal quality measurement for the first base station based on the received measurement configuration message as described above with reference to FIGS. 2-3. The signal measurement module 615 may also calculate a second signal quality measurement for the second base station based on the received measurement configuration message as described above with reference to FIGS. 2-3. In some examples, the first signal quality measurement comprises a first CQI associated with the second base station, and the second signal quality measurement comprises a second CQI associated with the first base station. The signal measurement module 615 may comply with each measurement configuration that is received. Accordingly, in the case that the signal measurement module 615 receives multiple base station specific measurement configuration messages and each base station specific measurement configuration defines a measurement algorithm, the signal measurement module 615 may comply with each of the different measurement algorithms associated with the different measurement configurations.

The measurement report module 620 may prepare a measurement report comprising the first signal quality measurement and the second signal quality measurement as described above with reference to FIGS. 2-3. The measurement report module 620 may also comply with each measurement configuration that is received. Accordingly, in the case that the measurement report module 620 receives multiple base station specific measurement configuration messages and each base station specific measurement configuration defines a different trigger condition, the measurement report module 620 may comply with each of the different trigger conditions associated with the different measurement configurations.

In some examples, the communication management module 410-*b* may include a trigger detection module (not shown) that may detect the trigger condition for at least one of the first air interface and the second air interface as described above with reference to FIGS. 2-3. In some examples, the communication management module 410-b may conduct an inter-air interface handover based at least in part on the reconfiguration message. The communication management module 410-b may also conduct an inter-air interface handover based at last in part on the detected RLF, wherein conducting the inter-air interface handover comprises providing a target base station information associated with at least one of the first or second base stations as described above with reference to FIGS. 2-3.

Figure 7:
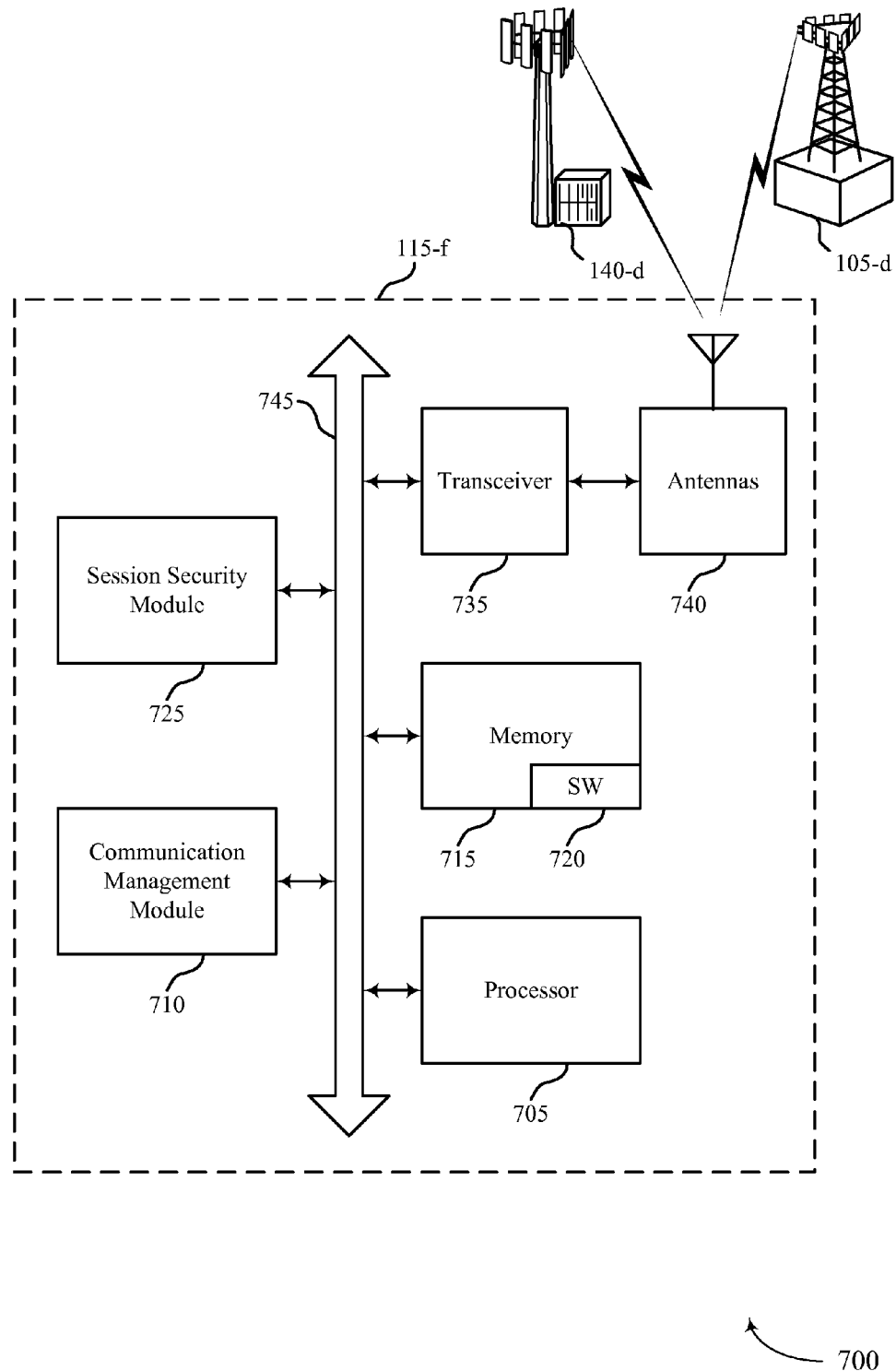
FIG. 7 illustrates a block diagram of a system including a UE configured for service specific air interface selection in accordance with various aspects of the present disclosure.

FIG. 7 shows a diagram of a system 700 including a UE 115 configured for service-specific air-interface selection in accordance with various aspects of the present disclosure. System 700 may include a UE 115-f, which may be an example of a UE 115 described above with reference to FIGS. 1-6. The UE 115-f may include a communications management module 710, which may be an example of a communication management module 410 described with reference to FIGS. 2-6. The UE 115-f may also include a session security module. The UE 115-f may also include components for bi-directional voice and data communications including components for transmitting communications and components for receiving communications. For example, the UE 115-f may communicate bi-directionally with UE 115, a base station 105-d of a first air-interface type and/or a base station 140-d of a second air-interface type. In some examples, the UE 115-f may communication with each of the first and second base stations of different air-interface types simultaneously.

The session security module may secure the first session using a first security key, the first security key derived based on a session key (e.g., Kasme) as described above with reference to FIGS. 2-3. The session security module may also secure the second session using a second security key, the second security key derived based on the Kasme, wherein the first and the second security key are different as described above with reference to FIGS. 2-3.

The UE 115-f may also include a processor module 705, and memory 715 (including software (SW)) 720, a transceiver module 735, and one or more antenna(s) 740, which each may communicate, directly or indirectly, with each other (e.g., via buses 745). The transceiver module 735 may communicate bi-directionally, via the antenna(s) 740 and/or wired or wireless links, with one or more networks, as described above. For example, the transceiver module 735 may communicate bi-directionally with a base station 105 and/or another UE 115. The transceiver module 735 may include a modem to modulate the packets and provide the modulated packets to the antenna(s) 740 for transmission, and to demodulate packets received from the antenna(s) 740. While the UE 115-f may include a single antenna 740, the UE 115-f may also have multiple antennas 740 capable of concurrently transmitting and/or receiving multiple wireless transmissions.

The memory 715 may include random access memory (RAM) and read only memory (ROM). The memory 715 may store computer-readable, computer-executable software/firmware code 720 including instructions that, when executed, cause the processor module 705 to perform various functions described herein (e.g., service-specific air-interface selection, etc.). Alternatively, the software/firmware code 720 may not be directly executable by the processor module 705 but cause a computer (e.g., when compiled and executed) to perform functions described herein. The processor module 705 may include an intelligent hardware device, e.g., a central processing unit (CPU), a microcontroller, an ASIC, etc.

Figure 8:
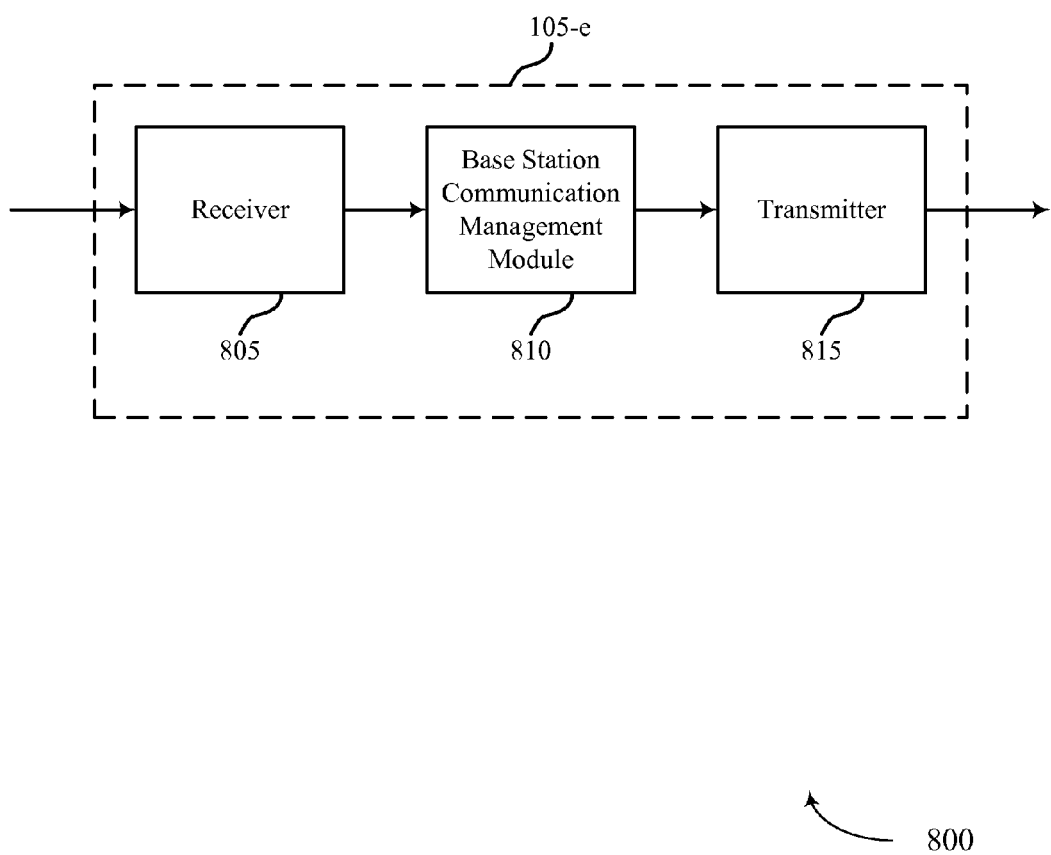
FIG. 8 shows a block diagram of a base station configured for service specific air interface selection in accordance with various aspects of the present disclosure.

FIG. 8 shows a block diagram 800 of a base station 105-e configured for service-specific air-interface selection in accordance with various aspects of the present disclosure. The base station 105-e may be an example of aspects of a base station 105 described with reference to FIGS. 1-7. The base station 105-e may include a receiver 805, a base station communication management module 810, and/or a transmitter 815. The base station 105-e may also include a processor. In some examples the base station 105-e may support multiple types of air-interfaces. For example, the base station 105-e may be configured to communication over LTE air-interface and/or mmW air-interface. Each of these components may be in communication with each other.

The components of the base station 105-e may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 805 may receive information such as packets, user data, and/or control information associated with various information channels (e.g., control channels, data channels, and information related to service-specific air-interface selection, etc.). Information may be passed on to the base station communication management module 810, and to other components of the base station 105-e.

The base station communication management module 810 may receive, at a target base station of a first air interface type, a handover request message from a source base station of a second air interface type, verify whether the target base station supports at least one bearer associated with the handover request message, and transmit an acknowledgment message based in part on the verification.

The transmitter 815 may transmit signals received from other components of the base station 105-e. In some embodiments, the transmitter 815 may be collocated with the receiver 805 in a transceiver module. The transmitter 815 may include a single antenna, or it may include a plurality of antennas. In some examples, the transmitter 815 may transmit the measurement report to the first base station and the second base station based at least in part on the detecting. In some examples, the transmitter 815 may periodically transmitting the measurement report to the first base station and the second base station base at least in part on the measurement configuration message.

Figure 9:
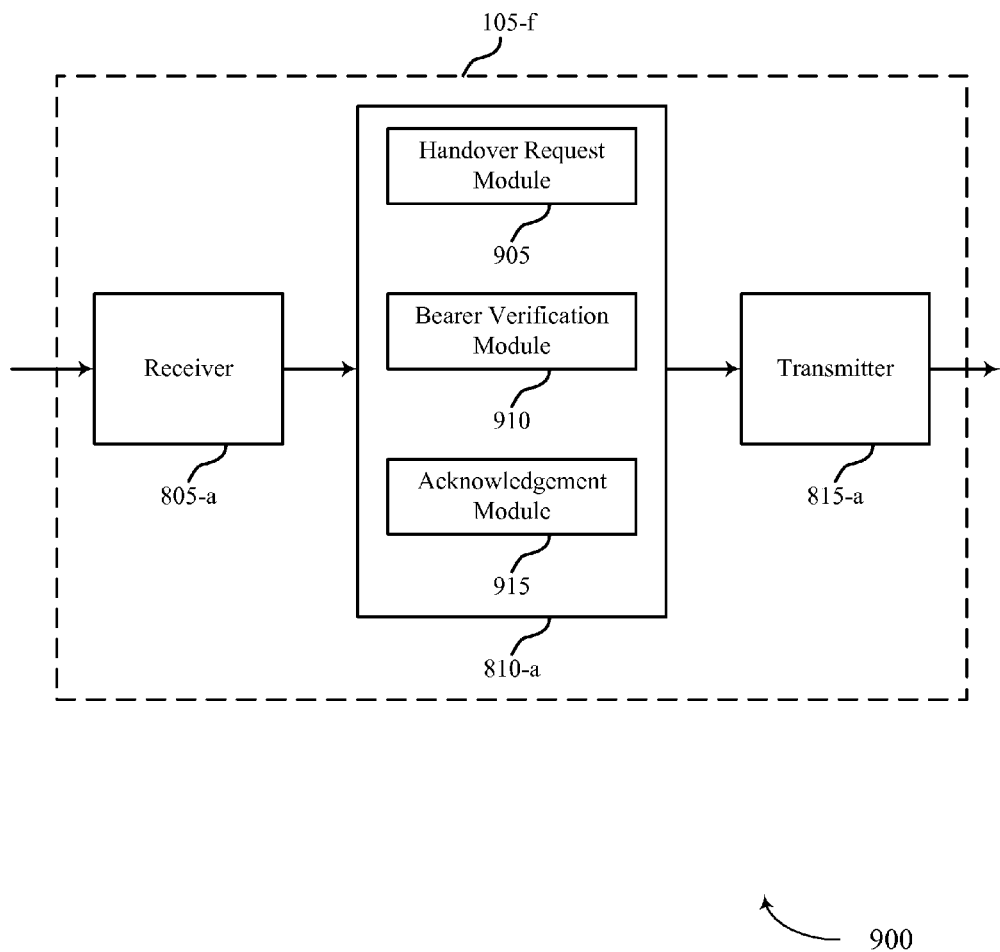
FIG. 9 shows a block diagram of a base station communications management module configured for service specific air interface selection in accordance with various aspects of the present disclosure.

FIG. 9 shows a block diagram 900 of a base station 105-f for service-specific air-interface selection in accordance with various aspects of the present disclosure. The base station 105-f may be an example of aspects of a base station 105 described with reference to FIGS. 1-8. The base station 105-f may include a receiver 805-a, a base station communication management module 810-a, and/or a transmitter 815-a. The base station 105-f may also include a processor. Each of these components may be in communication with each other. The base station communication management module 810-a may also include a handover request module 905, a bearer verification module 910, and an acknowledgement module 915. In some examples the base station 105-e may support multiple types of air-interfaces. For example, the base station 105-e may be configured to communication over LTE air-interface and/or mmW air-interface.

The components of the base station 105-f may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 805-a may receive information which may be passed on to the base station-a, and to other components of the base station 105-f. The base station communication management module 810-a may perform the operations described above with reference to FIG. 8. The transmitter 815-a may transmit signals received from other components of the base station 105-f The handover request module 905 may receive, at a target base station of a first air interface type, a handover request message from a source base station of a second air interface type as described above with reference to FIGS. 2-3. In some examples, the handover request includes information associated with at last one bearer scheduled for handover.

The bearer verification module 910 may verify whether the target base station supports at least one bearer associated with the handover request message as described above with reference to FIGS. 2-3.

The acknowledgement module 915 may transmit an acknowledgment message based in part on the verification as described above with reference to FIGS. 2-3.

Figure 10:
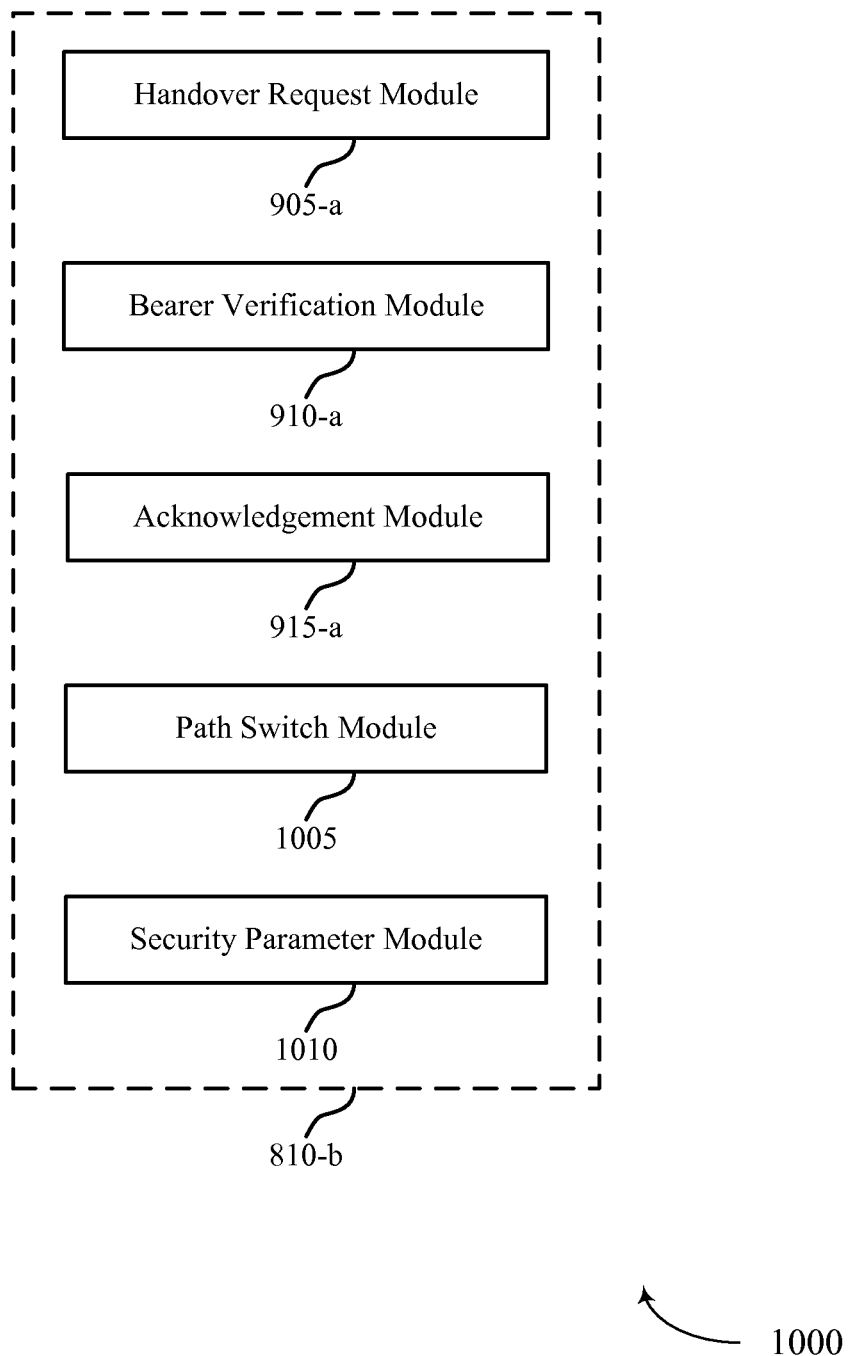
FIG. 10 shows a block diagram of a base station configured for service specific air interface selection in accordance with various aspects of the present disclosure.

FIG. 10 shows a block diagram 1000 of a base station communication management module 810-b for service-specific air-interface selection in accordance with various aspects of the present disclosure. The base station communication management module 810-b may be an example of aspects of a base station communication management module 810 described with reference to FIGS. 8-9. The base station communication management module 810-b may include a handover request module 905-a, a bearer verification module 910-a, and an acknowledgement module 915-a. Each of these modules may perform the functions described above with reference to FIG. 9. The base station communication management module 810-b may also include a path switch module 1005, and a security parameter module 1010.

The components of the base station communication management module 810-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The path switch module 1005 may transmit a path switch request message to an MME, the path switch request message comprising target base station air-interface type and a subscriber identification as described above with reference to FIGS. 2-3.

The security parameter module 1010 may receive a path switch acknowledgment message containing a security parameter in response to the path switch request message as described above with reference to FIGS. 2-3.

Figure 11:
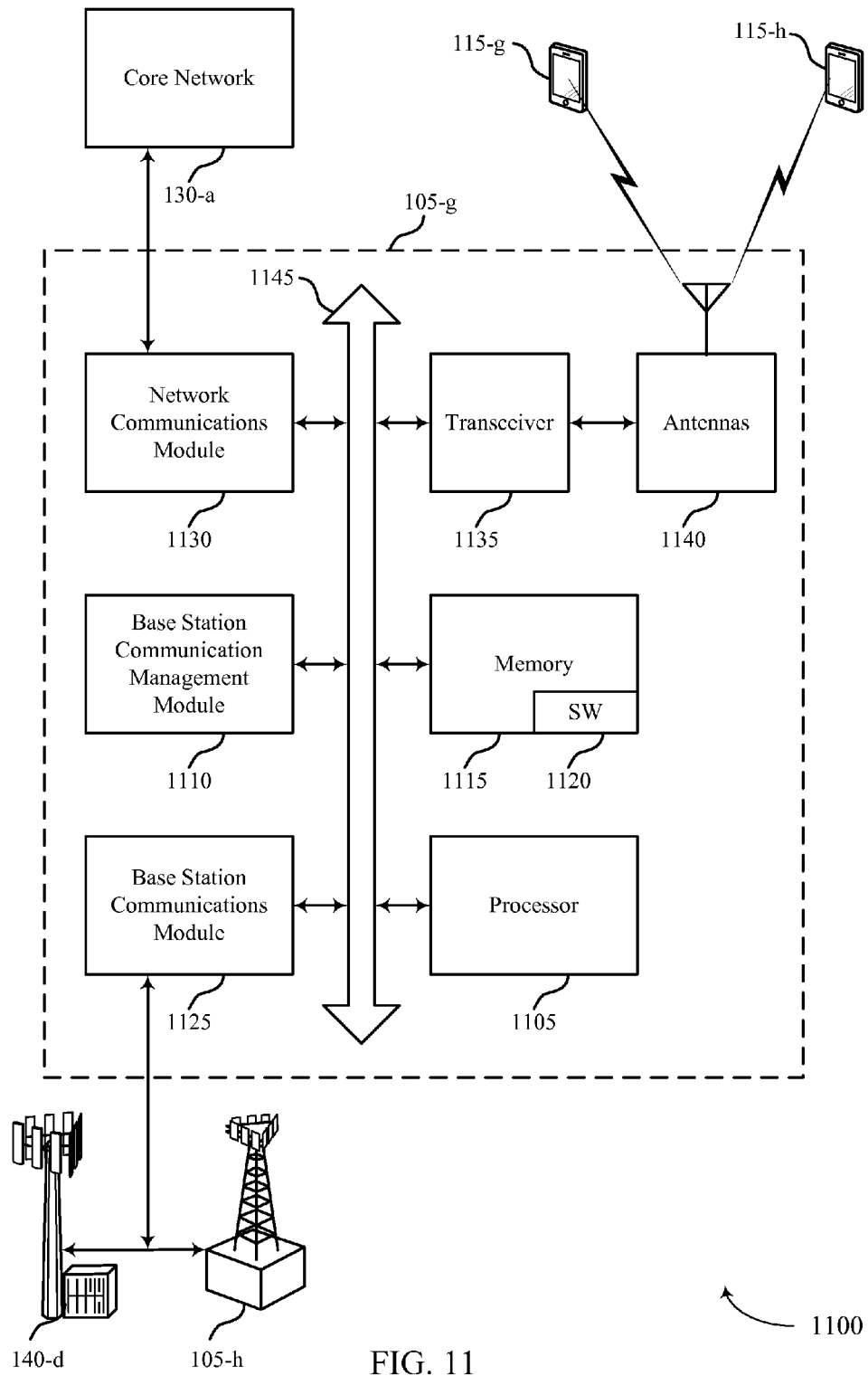
FIG. 11 illustrates a block diagram of a system including a base station configured for service specific air interface selection in accordance with various aspects of the present disclosure.

FIG. 11 shows a diagram of a system 1100 including a base station 105 configured for service-specific air-interface selection in accordance with various aspects of the present disclosure. System 1100 may include a base station 105-g, which may be an example of a base station 105-g described above with reference to FIGS. 1-10. The base station 105-g may include a base station communication management module 1110, which may be an example of a base station communication management module 810 described with reference to FIGS. 2-10. The base station 105-g may also include a session security module. The base station 105-g may also include components for bi-directional voice and data communications including components for transmitting communications and components for receiving communications. For example, the base station 105-g may communicate bi-directionally with base station 105-h of a first air-interface type and/or a base station 140-d of a second air-interface type.

The session security module may secure the first session using a first security key, the first security key derived based on a session key (e.g., Kasme) as described above with reference to FIGS. 2-3. The session security module may also secure the second session using a second security key, the second security key derived based on the Kasme, wherein the first and the second security key are different as described above with reference to FIGS. 2-3.

In some cases, the base station 105-g may have one or more wired backhaul links. The base station 105-g may have a wired backhaul link (e.g., S1 interface, etc.) to the core network 130. The base station 105-g may also communicate with other base stations 105, such as base station 105-m and base station 105-n via inter-base station backhaul links (e.g., an X2 interface). Each of the base stations 105 may communicate with UEs 115 using the same or different wireless communications technologies. In some cases, base station 105-g may communicate with other base stations such as 105-m and/or 105-n utilizing base station communication management module 1110. In some embodiments, base station communication management module 1110 may provide an X2 interface within an LTE/LTE-A wireless communication network technology to provide communication between some of the base stations 105. In some embodiments, base station 105-g may communicate with other base stations through core network 130. In some cases, base station 105-g may communicate with the core network 130 through network communications module 1135.

The base station 105-g may include, a processor module 1105, memory 1115 (including software (SW) 1120), transceiver modules 1130, and antenna(s) 1140, which each may be in communication, directly or indirectly, with each other (e.g., over bus system 1145). The transceiver modules 1130 may be configured to communicate bi-directionally, via the antenna(s) 1140, with the UEs 115, which may be multi-mode devices. The transceiver module 1130 (and/or other components of the base station 105-g) may also be configured to communicate bi-directionally, via the antennas 1140, with one or more other base stations (not shown). The transceiver module 1130 may include a modem configured to modulate the packets and provide the modulated packets to the antennas 1140 for transmission, and to demodulate packets received from the antennas 1140. The base station 105-g may include multiple transceiver modules 1130, each with one or more associated antennas 1140. The transceiver module may be an example of a combined receiver 805 and transmitter 815 of FIG. 8.

The memory 1115 may include RAM and ROM. The memory 1115 may also store computer-readable, computer-executable software code 1120 containing instructions that are configured to, when executed, cause the processor module 1110 to perform various functions described herein (e.g., service-specific air-interface selection, selecting coverage enhancement techniques, call processing, database management, message routing, etc.). Alternatively, the software 1120 may not be directly executable by the processor module 1105 but be configured to cause the computer, e.g., when compiled and executed, to perform functions described herein. The processor module 1105 may include an intelligent hardware device, e.g., a CPU, a microcontroller, an ASIC, etc. The processor module 1105 may include various special purpose processors such as encoders, queue processing modules, base band processors, radio head controllers, digital signal processor (DSPs), and the like.

The base station communications module 1125 may manage communications with other base stations 105. The communications management module may include a controller and/or scheduler for controlling communications with UEs 115 in cooperation with other base stations 105. For example, the base station communications module 1125 may coordinate scheduling for transmissions to UEs 115 for various interference mitigation techniques such as beam forming and/or joint transmission.

Figure 12:
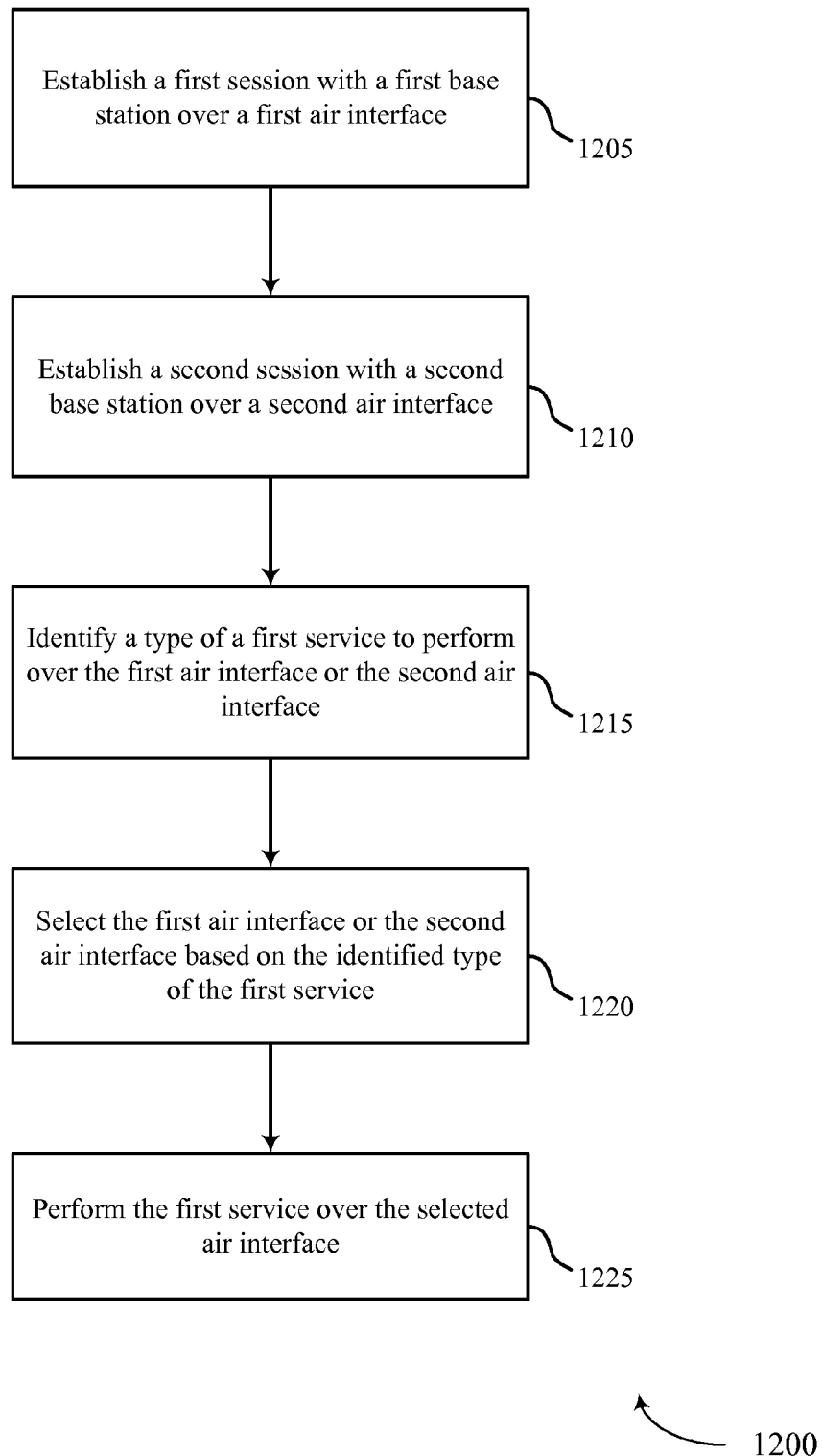
FIG. 12 shows a flowchart illustrating a method for service specific air interface selection in accordance with various aspects of the present disclosure.

FIG. 12 shows a flowchart illustrating a method 1200 for service-specific air-interface selection in accordance with various aspects of the present disclosure. The operations of method 1200 may be implemented by a UE 115 or its components as described with reference to FIGS. 1-11. For example, the operations of method 1200 may be performed by the base station communication management module 810 as described with reference to FIGS. 4-11. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may establish a first session with a first base station over a first air interface as described above with reference to FIGS. 2-3. In certain examples, the operations of block 1205 may be performed by the session establishment module 505 as described above with reference to FIG. 5.

At block 1210, the UE 115 may establish a second session with a second base station over a second air interface as described above with reference to FIGS. 2-3. In certain examples, the operations of block 1210 may be performed by the session establishment module 505 as described above with reference to FIG. 5.

At block 1215, the UE 115 may identify a type of a first service to perform over the first air interface or the second air interface as described above with reference to FIGS. 2-3. In certain examples, the operations of block 1215 may be performed by the service ID module 510 as described above with reference to FIG. 5.

At block 1220, the UE 115 may select the first air interface or the second air interface based at least in part on the identified type of the first service as described above with reference to FIGS. 2-3. In certain examples, the operations of block 1220 may be performed by the interface selection module 515 as described above with reference to FIG. 5.

At block 1225, the UE 115 may perform the first service over the selected air interface as described above with reference to FIGS. 2-3. In certain examples, the operations of block 1225 may be performed by the service module 520 as described above with reference to FIG. 5.

Figure 13:
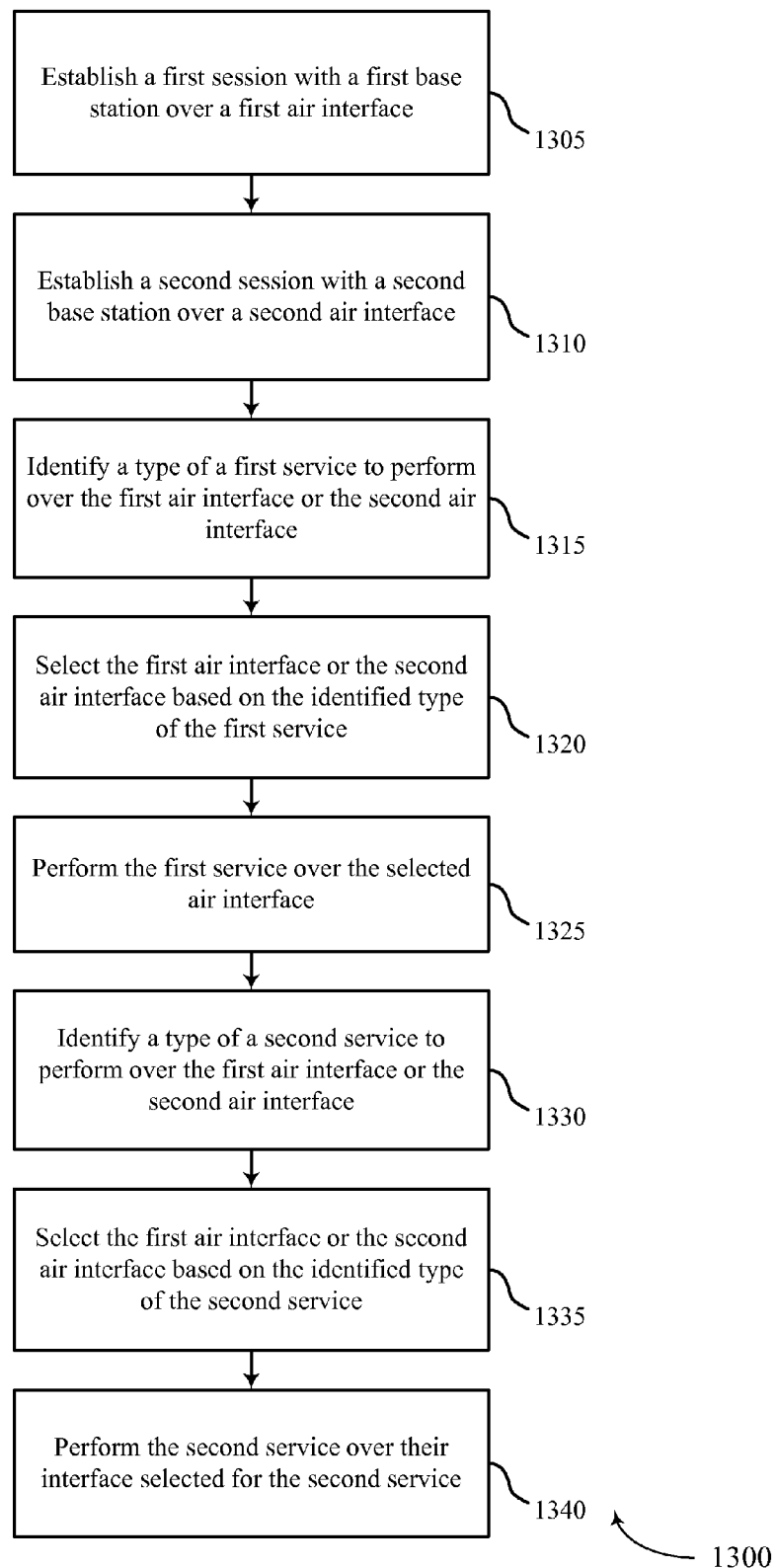
FIG. 13 shows a flowchart illustrating a method for service specific air interface selection in accordance with various aspects of the present disclosure.

FIG. 13 shows a flowchart illustrating a method 1300 for service-specific air-interface selection in accordance with various aspects of the present disclosure. The operations of method 1300 may be implemented by a UE 115 or its components as described with reference to FIGS. 1-11. For example, the operations of method 1300 may be performed by the base station communication management module 810 as described with reference to FIGS. 4-11. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of method 1200 of FIG. 12.

At block 1305, the UE 115 may establish a first session with a first base station over a first air interface as described above with reference to FIGS. 2-3. In certain examples, the operations of block 1305 may be performed by the session establishment module 505 as described above with reference to FIG. 5.

At block 1310, the UE 115 may establish a second session with a second base station over a second air interface as described above with reference to FIGS. 2-3. In certain examples, the operations of block 1310 may be performed by the session establishment module 505 as described above with reference to FIG. 5.

At block 1315, the UE 115 may identify a type of a first service to perform over the first air interface or the second air interface as described above with reference to FIGS. 2-3. In certain examples, the operations of block 1315 may be performed by the service ID module 510 as described above with reference to FIG. 5.

At block 1320, the UE 115 may select the first air interface or the second air interface based at least in part on the identified type of the first service as described above with reference to FIGS. 2-3. In certain examples, the operations of block 1320 may be performed by the interface selection module 515 as described above with reference to FIG. 5.

At block 1325, the UE 115 may perform the first service over the selected air interface as described above with reference to FIGS. 2-3. In certain examples, the operations of block 1325 may be performed by the service module 520 as described above with reference to FIG. 5.

At block 1330, the UE 115 may identify a type of a second service to perform over the first air interface or the second air interface as described above with reference to FIGS. 2-3. In certain examples, the operations of block 1330 may be performed by the service ID module 510 as described above with reference to FIG. 5.

At block 1335, the UE 115 may select the first air interface or the second air interface based at least in part on the identified type of the second service as described above with reference to FIGS. 2-3. In certain examples, the operations of block 1335 may be performed by the interface selection module 515 as described above with reference to FIG. 5.

At block 1340, the UE 115 may perform the second service over the air interface selected for the second service as described above with reference to FIGS. 2-3. In certain examples, the operations of block 1340 may be performed by the service module 520 as described above with reference to FIG. 5.

Figure 14:
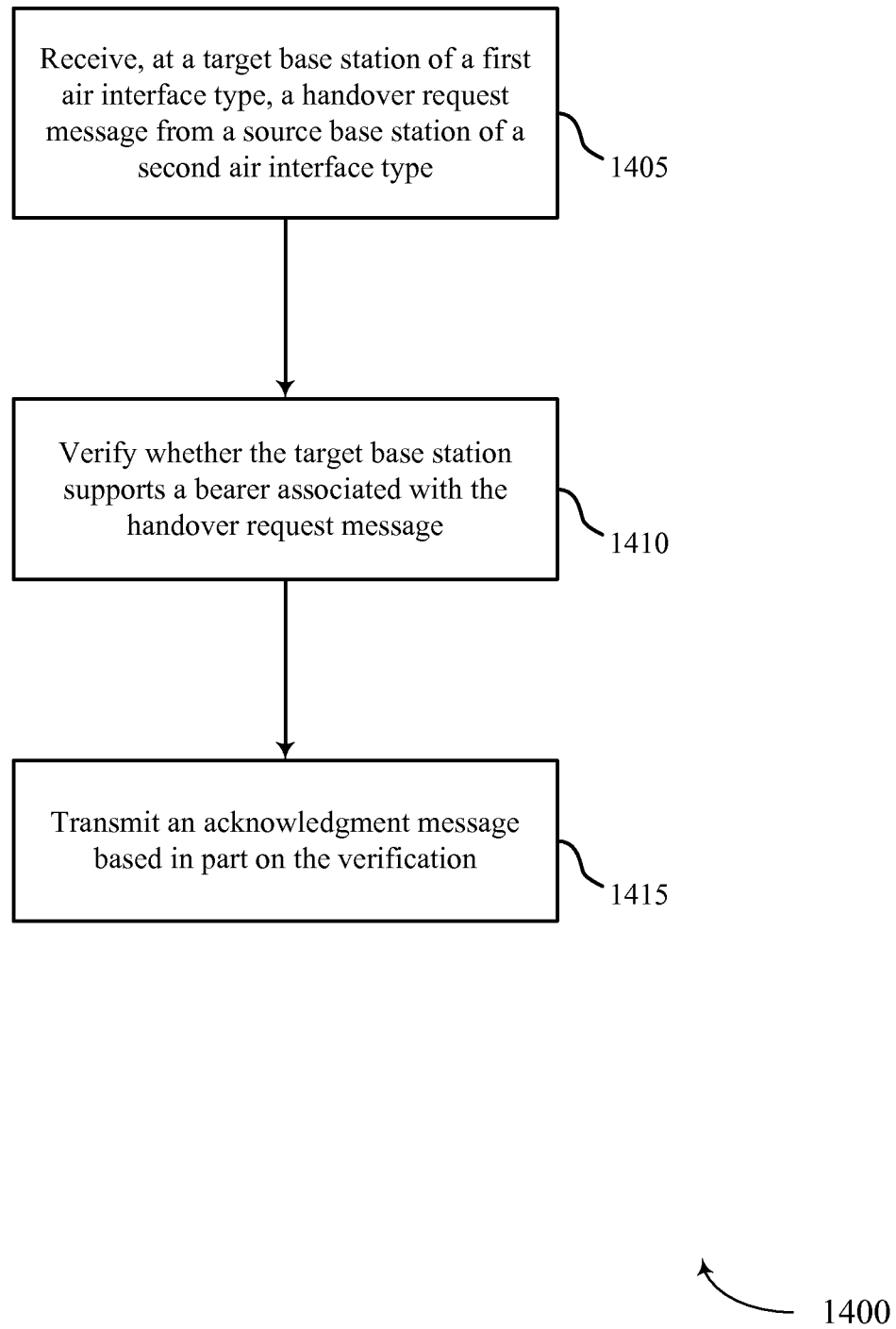
FIG. 14 shows a flowchart illustrating a method for service specific air interface selection in accordance with various aspects of the present disclosure.

FIG. 14 shows a flowchart illustrating a method 1400 for service-specific air-interface selection in accordance with various aspects of the present disclosure. The operations of method 1400 may be implemented by a base station 105 or its components as described with reference to FIGS. 1-11. For example, the operations of method 1400 may be performed by the base station communication management module 810 as described with reference to FIGS. 4-11. In some examples, a base station 105 may execute a set of codes to control the functional elements of the base station 105 to perform the functions described below. Additionally or alternatively, the base station 105 may perform aspects the functions described below using special-purpose hardware. The method 1400 may also incorporate aspects of methods 1200 and 1300 of FIGS. 12-13.

At block 1405, the base station 105 may receive, at a target base station of a first air interface type, a handover request message from a source base station of a second air interface type as described above with reference to FIGS. 2-3. In certain examples, the operations of block 1405 may be performed by the handover request module 905 as described above with reference to FIG. 9.

At block 1410, the base station 105 may verify whether the target base station supports at least one bearer associated with the handover request message as described above with reference to FIGS. 2-3. In certain examples, the operations of block 1410 may be performed by the bearer verification module 910 as described above with reference to FIG. 9.

At block 1415, the base station 105 may transmit an acknowledgment message based in part on the verification as described above with reference to FIGS. 2-3. In certain examples, the operations of block 1415 may be performed by the acknowledgement module 915 as described above with reference to FIG. 9.

Figure 15:
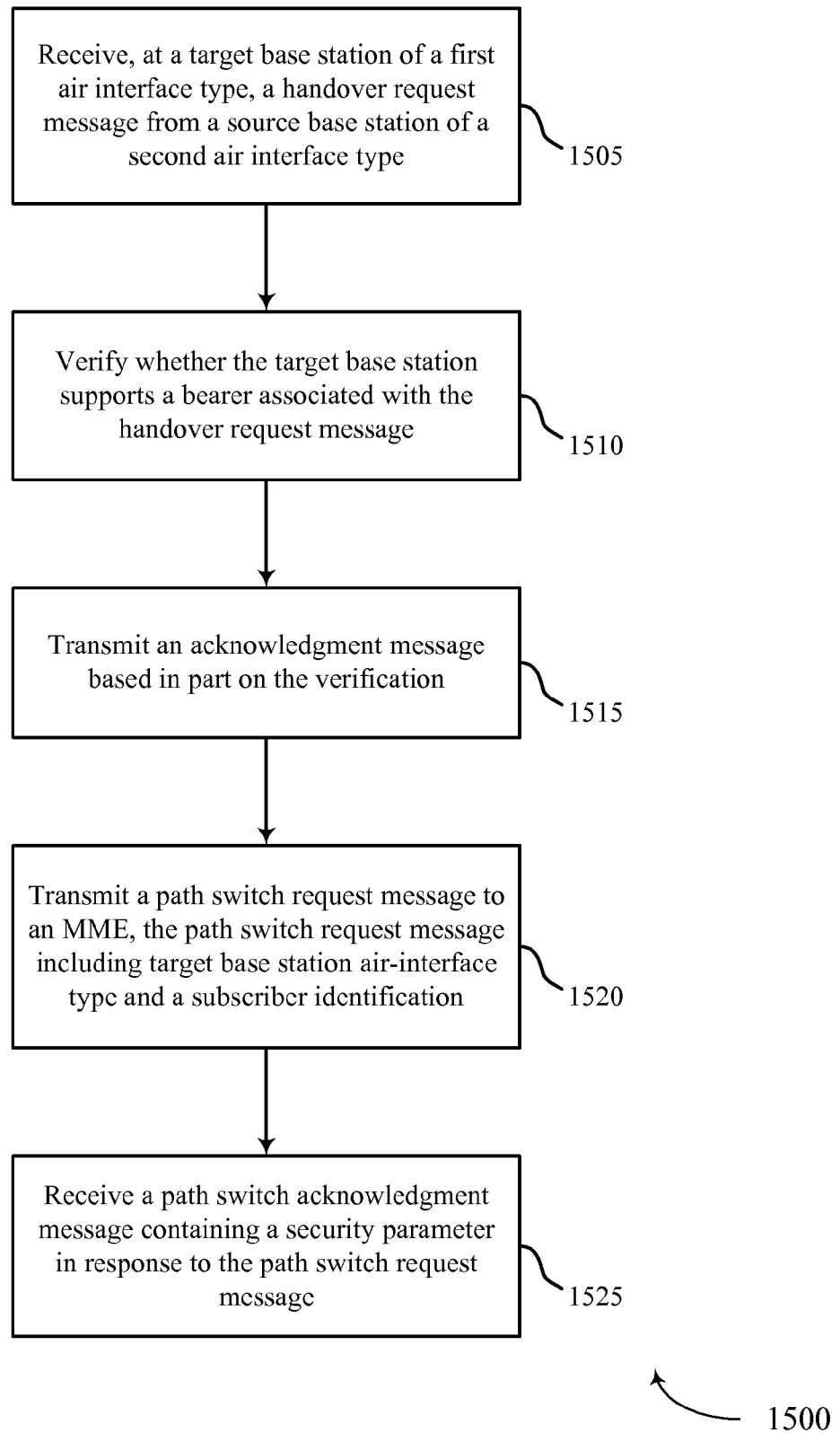
FIG. 15 shows a flowchart illustrating a method for service specific air interface selection in accordance with various aspects of the present disclosure.

FIG. 15 shows a flowchart illustrating a method 1500 for service-specific air-interface selection in accordance with various aspects of the present disclosure. The operations of method 1500 may be implemented by a base station 105 or its components as described with reference to FIGS. 1-11. For example, the operations of method 1500 may be performed by the base station communication management module 810 as described with reference to FIGS. 4-11. In some examples, a base station 105 may execute a set of codes to control the functional elements of the UE 115 to perform the functions described below. Additionally or alternatively, the base station 105 may perform aspects the functions described below using special-purpose hardware. The method 1500 may also incorporate aspects of methods 1200, 1300 and 1400 of FIGS. 12-16.

At block 1505, the base station 105 may receive, at a target base station of a first air interface type, a handover request message from a source base station of a second air interface type as described above with reference to FIGS. 2-3. In certain examples, the operations of block 1505 may be performed by the handover request module 905 as described above with reference to FIG. 9.

At block 1510, the base station 105 may verify whether the target base station supports at least one bearer associated with the handover request message as described above with reference to FIGS. 2-3. In certain examples, the operations of block 1510 may be performed by the bearer verification module 910 as described above with reference to FIG. 9.

At block 1515, the base station 105 may transmit an acknowledgment message based in part on the verification as described above with reference to FIGS. 2-3. In certain examples, the operations of block 1515 may be performed by the acknowledgement module 915 as described above with reference to FIG. 9.

At block 1520, the base station 105 may transmit a path switch request message to an MME, the path switch request message comprising target base station air-interface type and a subscriber identification as described above with reference to FIGS. 2-3. In certain examples, the operations of block 1520 may be performed by the path switch module 1005 as described above with reference to FIG. 1.

At block 1525, the base station 105 may receive a path switch acknowledgment message containing a security parameter in response to the path switch request message as described above with reference to FIGS. 2-3. In certain examples, the operations of block 1525 may be performed by the security parameter module 1010 as described above with reference to FIG. 1.

Thus, methods 1200, 1300, 1400 and 1500 may provide for service-specific air-interface selection. It should be noted that methods 1200, 1300, 1400 and 1500 describe possible implementation, and that the operations and the steps may be rearranged or otherwise modified such that other implementations are possible. In some examples, aspects from two or more of the methods 1200, 1300, 1400 and 1500 may be combined.

Figure 16:
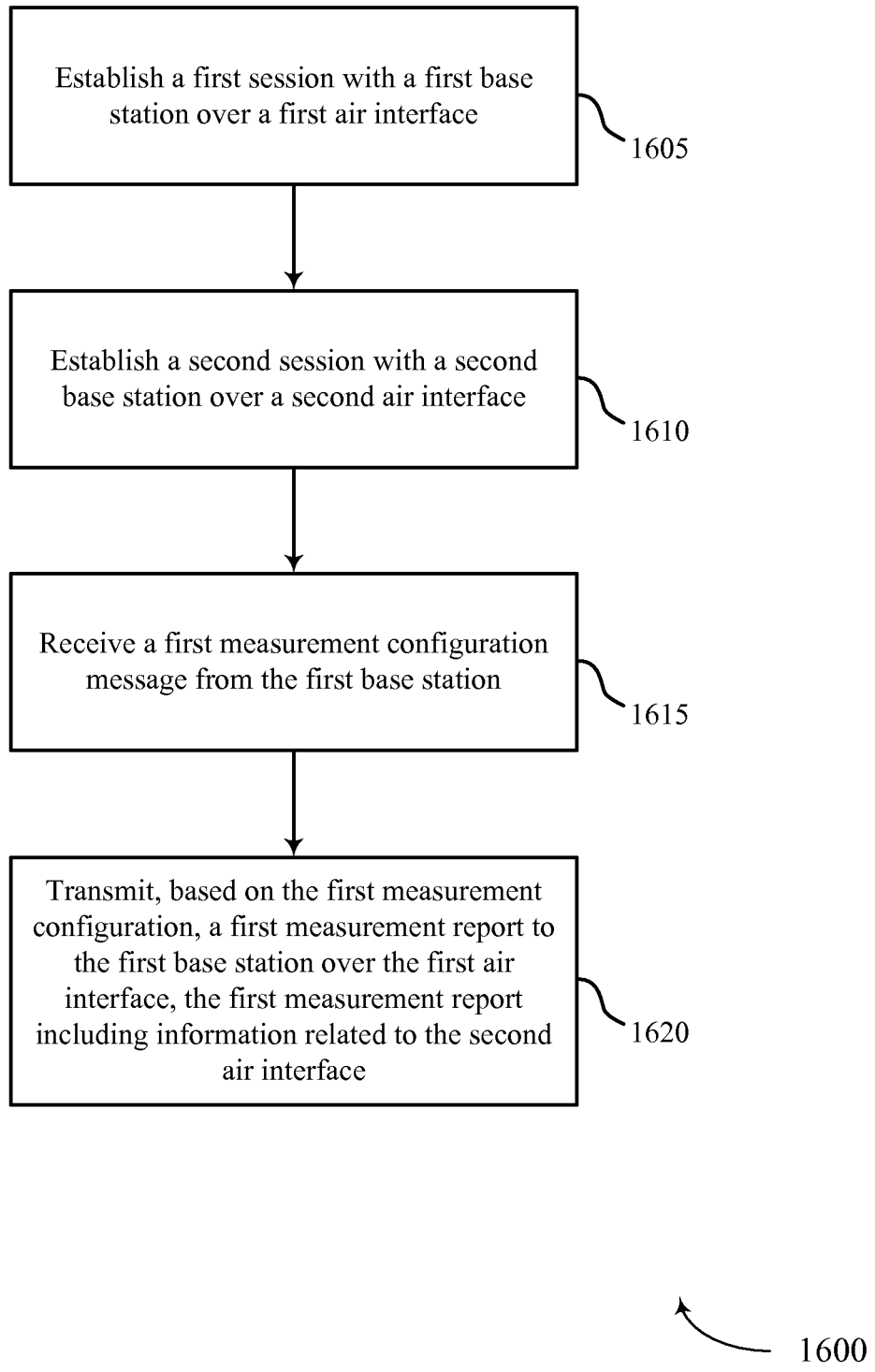
FIG. 16 shows a flowchart illustrating a method for coordinating measurement configurations and measurement reports for simultaneous multi-air-interface operation in accordance with various aspects of the present disclosure.

FIG. 16 shows a flowchart illustrating a method 1600 for coordinating measurement configurations and measurement reports for simultaneous multi-air-interface operation in accordance with various aspects of the present disclosure. The operations of method 1600 may be implemented by a UE 115 or its components as described with reference to FIGS. 1-7. For example, the operations of method 1600 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 1605, the UE 115 may establish a first session with a first base station over a first air interface as described above with reference to FIGS. 2-3. In certain examples, the operations of block 1605 may be performed by the session establishment module 505 as described above with reference to FIG. 5.

At block 1610, the UE 115 may establish a second session with a second base station over a second air interface as described above with reference to FIGS. 2-3. In certain examples, the operations of block 1610 may be performed by the session establishment module 505 as described above with reference to FIG. 5.

At block 1615, the UE 115 may receive a first measurement configuration message from the first base station as described above with reference to FIG. 6. In certain examples, the operations of block 1615 may be performed by the communication management module 410 as described above with reference to FIGS. 4-6.

At block 1620, the UE 115 may transmit, based on the first measurement configuration, a first measurement report to the first base station over the first air interface. The first measurement report may include information related to the second air interface as described above with reference to FIG. 6. In certain examples, the operations of block 1620 may be performed by the measurement report module 620 as described above with reference to FIG. 6.

Figure 17:
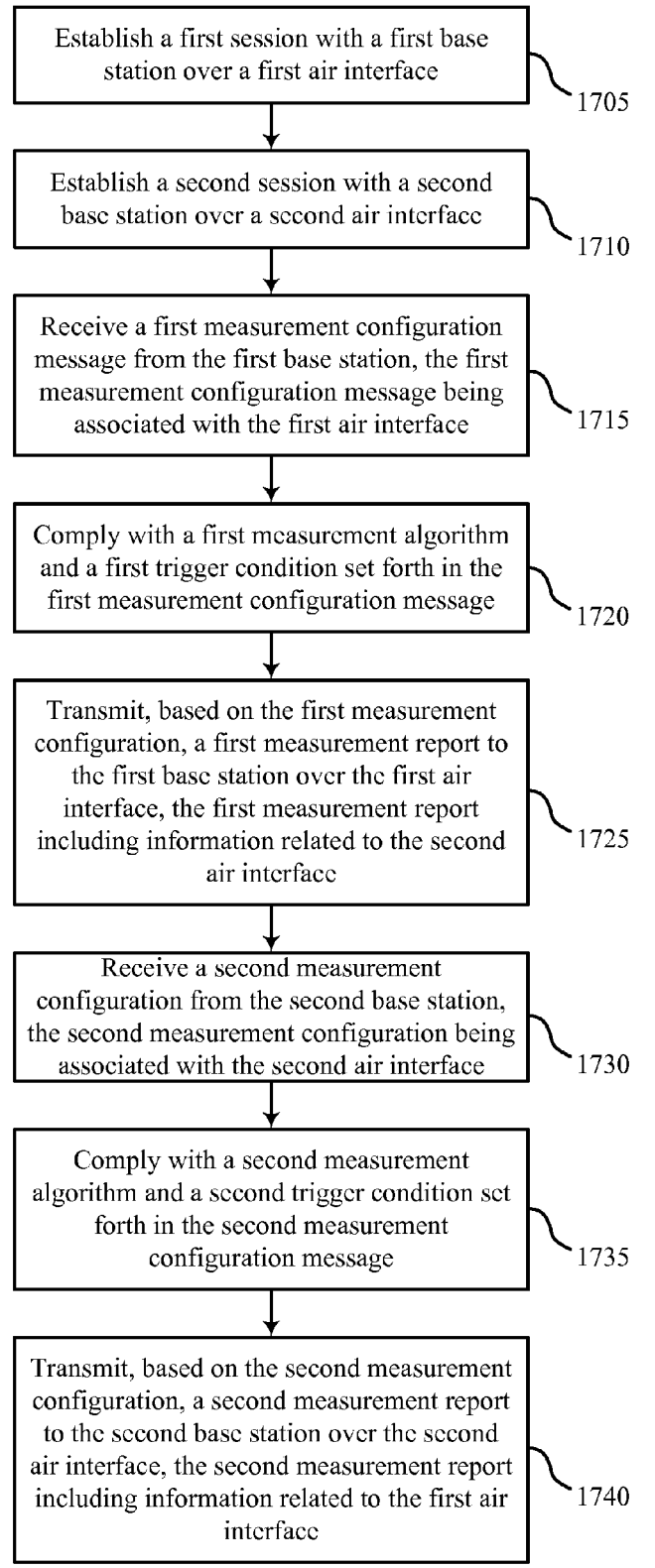
FIG. 17 shows a flowchart illustrating a method for coordinating measurement configurations and measurement reports for simultaneous multi-air-interface operation in accordance with various aspects of the present disclosure.

FIG. 17 shows a flowchart illustrating a method 1700 for coordinating measurement configurations and measurement reports for simultaneous multi-air-interface operation in accordance with various aspects of the present disclosure. The operations of method 1700 may be implemented by a UE 115 or its components as described with reference to FIGS. 1-7. For example, the operations of method 1700 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 1705, the UE 115 may establish a first session with a first base station over a first air interface as described above with reference to FIGS. 2-3. In certain examples, the operations of block 1705 may be performed by the session establishment module 505 as described above with reference to FIG. 5.

At block 1710, the UE 115 may establish a second session with a second base station over a second air interface as described above with reference to FIGS. 2-3. In certain examples, the operations of block 1710 may be performed by the session establishment module 505 as described above with reference to FIG. 5.

At block 1715, the UE 115 may receive a first measurement configuration message from the first base station as described above with reference to FIG. 6. The first measurement configuration message may be associated with the first air interface. In certain examples, the operations of block 1715 may be performed by the communication management module 410 as described above with reference to FIGS. 4-6.

At block 1720, the UE 115 may comply with a first measurement algorithm and a first trigger condition set forth in the first measurement configuration message as described above with reference to FIG. 6. In certain examples, the operations of block 1720 may be performed by the signal measurement module 610 as described above with reference to FIG. 6.

At block 1725, the UE 115 may transmit, based on the first measurement configuration, a first measurement report to the first base station over the first air interface. The first measurement report may include information related to the second air interface as described above with reference to FIG. 6. In certain examples, the operations of block 1725 may be performed by the measurement report module 620 as described above with reference to FIG. 6.

At block 1730, the UE 115 may receive a second measurement configuration message from the second base station as described above with reference to FIG. 6. The second measurement configuration message may be associated with the second air interface. In certain examples, the operations of block 1730 may be performed by the communication management module 410 as described above with reference to FIGS. 4-6.

At block 1735, the UE 115 may comply with a second measurement algorithm and a second trigger condition set forth in the second measurement configuration message as described above with reference to FIG. 6. In certain examples, the operations of block 1735 may be performed by the signal measurement module 610 as described above with reference to FIG. 6.

At block 1740, the UE 115 may transmit, based on the second measurement configuration, a second measurement report to the first base station over the second air interface. The second measurement report may include information related to the first air interface as described above with reference to FIG. 6. In certain examples, the operations of block 1740 may be performed by the measurement report module 620 as described above with reference to FIG. 6.

Figure 18:
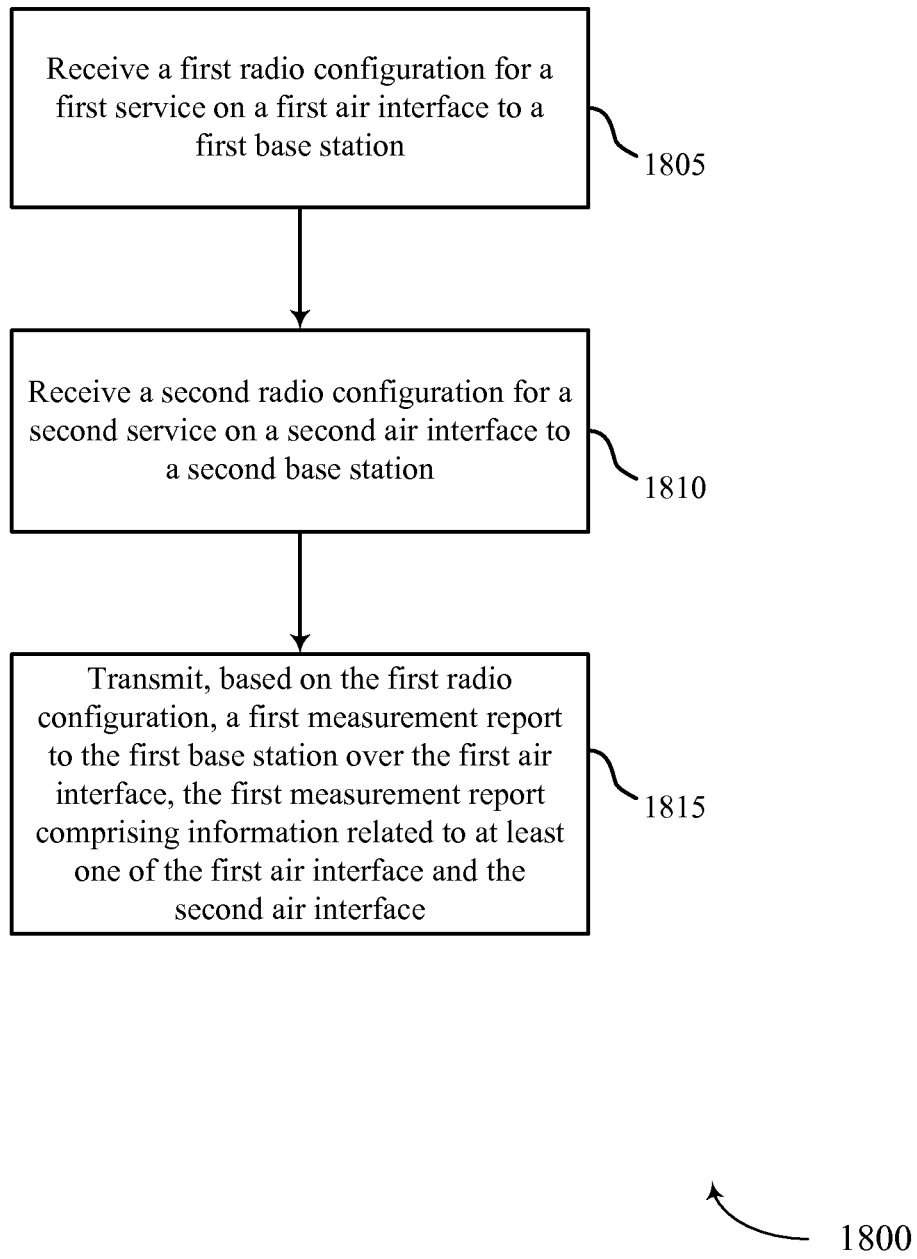
FIG. 18 shows a flowchart illustrating a method for service specific air interface selection in accordance with various aspects of the present disclosure.

FIG. 18 shows a flowchart illustrating a method 1800 for service-specific air-interface selection in accordance with various aspects of the present disclosure. The operations of method 1800 may be implemented by a UE 115 or its components as described with reference to FIGS. 1-11. For example, the operations of method 1800 may be performed by the communication management module 410 as described with reference to FIGS. 4-11. In some examples, a UE 115 may execute a set of codes to control the functional elements of the UE 115 to perform the functions described below. Additionally or alternatively, the UE 115 may perform aspects the functions described below using special-purpose hardware.

At block 1805, the UE 115 may receive a first radio configuration for a first service on a first air interface to a first base station as described above with reference to FIGS. 2-3. In certain examples, the operations of block 1805 may be performed by the session establishment module 505 as described above with reference to FIG. 5.

At block 1810, the UE 115 may receive a second radio configuration for a second service on a second air interface to a second base station as described above with reference to FIGS. 2-3. In certain examples, the operations of block 1810 may be performed by the session establishment module 505 as described above with reference to FIG. 5.

At block 1815, the UE 115 may transmit, based on the first radio configuration, a first measurement report to the first base station over the first air interface, the first measurement report comprising information related to at least one of the first air interface and the second air interface as described above with reference to FIGS. 2-3. In certain examples, the operations of block 1815 may be performed by the service module 520 as described above with reference to FIG. 5.

Thus, method 1600, 1700, and 1800 may provide coordination of measurement configurations and measurement reports for simultaneous multi-air-interface operation. For example, in multi-air-interface operation where service-specific air-interface selection may be implemented. It should be noted that methods 1600-1800 describe possible implementations, and that the operations and the steps may be rearranged or otherwise modified such that other implementations are possible. In some examples, aspects from two or more of the methods 1200, 1300, 1400, 1500, 1600, 1700, and 1800 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
receiving a first radio configuration for a first service on a first air interface to a first base station;
receiving a second radio configuration for a second service on a second air interface to a second base station, wherein the first radio configuration and the second radio configuration include one or more data radio bearers and at least one measurement configuration, and wherein the first radio configuration and the second radio configuration are for different air interface technologies;
transmitting, based on the first radio configuration, a first measurement report to the first base station over the first air interface, the first measurement report comprising information related to the first air interface and the second air interface; and
conducting an inter-air interface handover of a first connection to a core network to the second base station based at least in part on the transmitted first measurement report, wherein the first connection is dedicated to a set of services, wherein the inter-air interface handover comprises an inter-air interface handover of a first subset of bearers from the first air interface to the second air interface and a retention of a second subset of bearers with the first air interface, and wherein a first subset of the set of services correspond to the first subset of bearers and a second subset of the set of services corresponds to the second subset of bearers.

2. The method of claim 1, wherein the first radio configuration is associated with the first connection to the core network, and wherein the second radio configuration is associated with a second connection to the core network.

3. The method of claim 2, further comprising:
performing a handover of the first connection to the second base station concurrently with performing communications via the second base station and the core network.

4. The method of claim 1, further comprising:
initiating establishment of the first radio configuration via a first service request message to a core network; and
initiating establishment of the second radio configuration via a second service request message to the core network while exchanging data with the core network via the first radio configuration.

5. The method of claim 4, wherein the first service request message comprises a first service type identifier and the second service request message comprises a second service type identifier.

6. The method of claim 1, further comprising:
transmitting, based on the second radio configuration, a second measurement report to the second base station over the second air interface, the second measurement report including information related to the first air interface.

7. The method of claim 1, wherein the second radio configuration message comprises information on a measurement algorithm and a trigger condition for the second air interface.

8. The method of claim 7, wherein the first radio configuration comprises information associated with a first measurement algorithm and a first trigger condition for the first air interface and the second radio configuration comprises information associated with a second measurement algorithm and a second trigger condition for the second air interface.

9. The method of claim 8, further comprising:
complying with both the first measurement algorithm and the first trigger condition set forth in the first radio configuration and the second measurement algorithm and the second trigger condition set forth in the second radio configuration.

10. The method of claim 1, wherein the first radio configuration comprises information associated with a measurement algorithm and a trigger condition for both the first air interface and the second air interface.

11. The method of claim 1, further comprising:
receiving a reconfiguration message over the first air interface or the second air interface; and
conducting the inter-air interface handover based at least in part on the reconfiguration message.

12. The method of claim 1, further comprising:
establishing a radio bearer with at least one of the first or the second base station.

13. The method of claim 12, further comprising:
establishing the radio bearer with the first base station over the first air interface while simultaneously exchanging data with the second base station over the second air interface.

14. The method of claim 1, further comprising:
transmitting a first request to a mobility management entity (MME), the first request indicating a type of the first air interface and transmitting a second request to the MME, the second request indicating a type of the second air interface.

15. The method of claim 14, wherein the first request and the second request are non-access stratum (NAS) service requests.

16. The method of claim 14, wherein the first request and the second request each comprise a Globally Unique Mobility Management Entity Identifier (GUMMEI) that identifies the MME.

17. The method of claim 1, further comprising:
securing a first session over the first air interface using a first security key, the first security key derived based on a session key (Kasme); and
securing a second session over the second air interface using a second security key, the second security key derived based on the Kasme, wherein the first and the second security key are different.

18. The method of claim 1, further comprising:
detecting a radio link failure (RLF) on at least one of the first air interface or the second air interface; and
conducting an inter-air interface handover based at last in part on the detected RLF, wherein conducting the inter-air interface handover comprises providing a target base station information associated with at least one of the first or second base stations.

19. The method of claim 1, wherein a first session over the first air interface and a second session over the second air interface are established using a single a mobility management entity (MME).

20. The method of claim 1, wherein a first session over the first air interface and a second session over the second air interface are established using a single serving gateway (S-GW).

21. The method of claim 1, wherein the first air interface is a Long Term Evolution (LTE) air interface and the second air interface is a millimeter-wave air interface.

22. The method of claim 1, wherein a first type of service is performed over the first air interface and a second type of service is performed simultaneously over the second air interface.

23. An apparatus for wireless communication at a user equipment (UE), comprising:
means for receiving a first radio configuration for a first service on a first air interface to a first base station;
means for receiving a second radio configuration for a second service on a second air interface to a second base station, wherein the first and second radio configurations include one or more data radio bearers and at least one measurement configuration, and wherein the first radio configuration and the second radio configuration are for different air interface technologies;
means for transmitting, based on the first radio configuration, a first measurement report to the first base station over the first air interface, the first measurement report comprising information related to the first air interface and the second air interface; and
means for conducting an inter-air interface handover of a first connection to a core network to the second base station based at least in part on the transmitted first measurement report, wherein the first connection is dedicated to a set of services, wherein the inter-air interface handover comprises an inter-air interface handover of a first subset of bearers from the first air interface to the second air interface and a retention of a second subset of bearers with the first air interface, and wherein a first subset of the set of services correspond to the first subset of bearers and a second subset of the set of services corresponds to the second subset of bearers.

24. The apparatus of claim 23, wherein the first radio configuration is associated with the first connection to the core network, and wherein the second radio configuration is associated with a second connection to the core network.

25. The apparatus of claim 24, further comprising:
  means for performing a handover of the first connection to the second base station concurrently with performing communications via the second base station and the core network.

26. The apparatus of claim 23, further comprising:
  means for initiating establishment of the first radio configuration via a first service request message to a core network; and
  means for initiating establishment of the second radio configuration via a second service request message to the core network while exchanging data with the core network via the first radio configuration.

27. The apparatus of claim 26, wherein the first service request message comprises a first service type identifier and the second service request message comprises a second service type identifier.

28. An apparatus for wireless communication at a user equipment (UE), comprising:
  a processor;
  memory in electronic communication with the processor; and
  instructions stored in the memory; wherein the instructions are executable by the processor to:
    receive a first radio configuration for a first service on a first air interface to a first base station;
    receive a second radio configuration for a second service on a second air interface to a second base station, wherein the first and second radio configurations include one or more data radio bearers and at least one measurement configuration, and wherein the first radio configuration and the second radio configuration are for different air interface technologies;
    transmit, based on the first radio configuration, a first measurement report to the first base station over the first air interface, the first measurement report comprising information related to the first air interface and the second air interface; and
    conduct an inter-air interface handover of a first connection to a core network to the second base station based at least in part on the transmitted first measurement report, wherein the first connection is dedicated to a set of services, wherein the inter-air interface handover comprises an inter-air interface handover of a first subset of bearers from the first air interface to the second air interface and a retention of a second subset of bearers with the first air interface, and wherein a first subset of the set of services correspond to the first subset of bearers and a second subset of the set of services corresponds to the second subset of bearers.

29. A non-transitory computer-readable medium storing code for wireless communication at a user equipment (UE), the code comprising instructions executable to:
  receive a first radio configuration for a first service on a first air interface to a first base station;
  receive a second radio configuration for a second service on a second air interface to a second base station, wherein the first and second radio configurations include one or more data radio bearers and at least one measurement configuration, and wherein the first radio configuration and the second radio configuration are for different air interface technologies;
  transmit, based on the first radio configuration, a first measurement report to the first base station over the first air interface, the first measurement report comprising information related to the first air interface and the second air interface; and
  conduct an inter-air interface handover of a first connection to a core network to the second base station based at least in part on the transmitted first measurement report, wherein the first connection is dedicated to a set of services, wherein the inter-air interface handover comprises an inter-air interface handover of a first subset of bearers from the first air interface to the second air interface and a retention of a second subset of bearers with the first air interface, and wherein a first subset of the set of services correspond to the first subset of bearers and a second subset of the set of services corresponds to the second subset of bearers.

* * * * *